United States Patent
Koiso et al.

(10) Patent No.: US 7,329,190 B2
(45) Date of Patent: Feb. 12, 2008

(54) TORQUE TRANSMISSION APPARATUS

(75) Inventors: Nobuo Koiso, Tokyo-to (JP); Toshikazu Ban, Tokyo-to (JP)

(73) Assignee: THK Co., Ltd, Tokyo (JP)

( * ) Notice: Subject to any disclaimer, the term of this patent is extended or adjusted under 35 U.S.C. 154(b) by 406 days.

(21) Appl. No.: 10/805,409

(22) Filed: Mar. 22, 2004

(65) Prior Publication Data

US 2004/0192448 A1    Sep. 30, 2004

(30) Foreign Application Priority Data

Mar. 24, 2003  (JP)  ............................ P2003-080778
Mar. 31, 2003  (JP)  ............................ P2003-095212
Jun. 17, 2003  (JP)  ............................ P2003-172279

(51) Int. Cl.
*F16D 3/04*  (2006.01)
(52) U.S. Cl. .................. 464/102; 464/103; 464/106
(58) Field of Classification Search ............... 464/102, 464/103, 106; 384/45, 49
See application file for complete search history.

(56) References Cited

U.S. PATENT DOCUMENTS 4,384,859  A  *  5/1983  Teramachi  ................... 464/103
5,092,826  A  *  3/1992  Harle  .......................... 464/102

* cited by examiner

*Primary Examiner*—Aaron Dunwoody
(74) *Attorney, Agent, or Firm*—Westerman, Hattori, Daniels & Adrian, LLP.

(57) ABSTRACT

An apparatus for transmitting torque from a driving unit to a driven unit, comprising the first unit, the second unit and a plurality of torque transmission units. The first unit serves as the driving unit, which is rotatable around a central axis thereof. The second unit serving as the driven unit, which is rotatable around a central axis thereof. The torque transmission units transmits torque from the first unit to the second unit. The torque transmission units enables a relative displacement between the first unit and the second unit in a direction perpendicular to the central axis of the first unit in a state in which the central axes of the first and second units are kept in parallel with each other. The torque transmission units are placed at different positions from the central axis of the first unit.

4 Claims, 20 Drawing Sheets

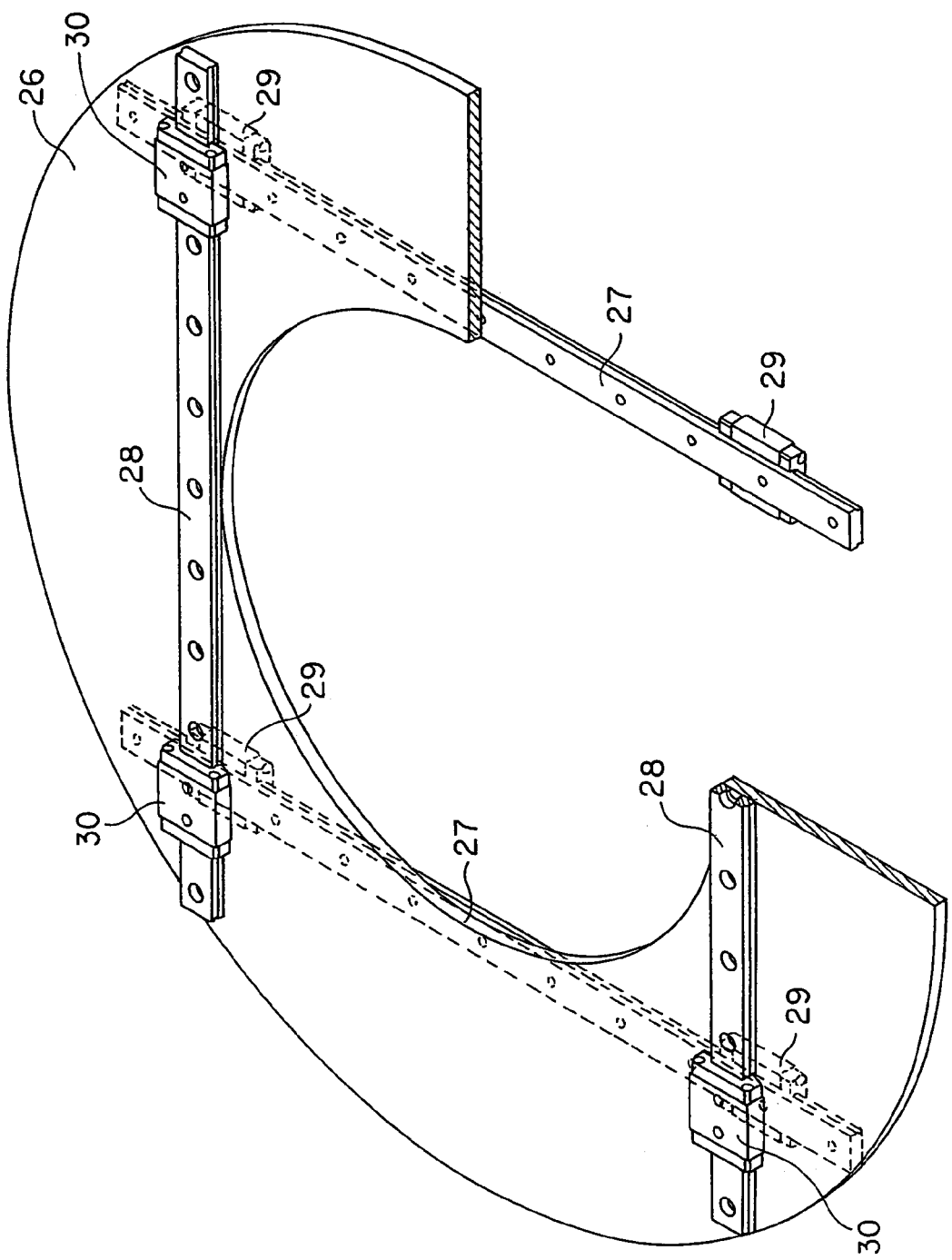

TORQUE TRANSMISSION APPARATUS

BACKGROUND OF THE INVENTION

1. Field of the Invention

The present invention relates to a torque transmission apparatus for transmitting rotation of a driving unit to a driven unit.

2. Related Art

An Oldham coupling is known as a shaft coupling that can be applied in case where the central axis of a driving unit and the central axis of a driven unit can deviate from each other so as to keep them in parallel with each other. As shown in FIG. 34, an intermediate plate 3 serving as a floating cam is inserted between a driving unit 1 and a driven unit 2, so as to deviate freely during rotation thereof. Rotation of the driving unit 1 causes the intermediate plate 3 to rotate at the same rotational speed, while sliding relative to the driving unit 1, and also causes the driven unit 3 to rotate at the same rotational speed, while sliding relative to the intermediate plate 3. The intermediate plate 3 is provided with projections 3a, 3b, which slide relative to the driving unit 1 and the driven unit 2, respectively, while being subjected to pressure applied therefrom during rotation.

Transmission of a large torque with the use of Oldham coupling requires a large floating cam. This causes an increased weight of the whole coupling. In addition, it is difficult to decrease the thickness of the coupling, and more specifically, to achieve miniaturization of the coupling in a direction of the central axis thereof.

SUMMARY OF THE INVENTION

An object of the present invention is therefore to provide a torque transmission apparatus, which enables a relative displacement between a driving unit and a driven unit in a state in which the central axes thereof are kept in parallel with each other, and permits to provide transmission of a large torque in a small size.

In order to attain the aforementioned object, a torque transmission apparatus according to one of aspects of the present invention for transmitting torque from a driving unit to a driven unit, comprises:

a first unit serving as the driving unit, which is rotatable around a central axis thereof;

a second unit serving as the driven unit, which is rotatable around a central axis thereof; and a plurality of torque transmission units for transmitting torque from said first unit to said second unit, said plurality of torque transmission units enabling a relative displacement between said first unit and said second unit in a direction perpendicular to the central axis of said first unit in a state in which the central axis of said first unit and the central axis of said second unit are kept in parallel with each other, said plurality of torque transmission units being placed at different positions from the central axis of said first unit.

There may be adopted a structure in which said first unit has a reference plane; said second unit has a reference plane, which face the reference plane of said first unit; and each of said plurality of torque transmission units comprises: a first rail mounted on said first unit, said first rail extending linearly in a predetermined direction on the reference plane of said first unit; a second rail mounted on said second unit so as to be spaced apart from said first rail in a direction, which is in parallel with the central axis of said first unit, said second rail extending linearly on the reference plane of said second unit in a different direction from said predetermined direction along which said first rail extends; and a connection block for connecting said first rail and said second rail to each other, said connection block being slidable relative to each of said first rail and said second rail.

According to the present invention, it is possible to distribute load applied to the whole apparatus to the plurality of torque transmission units, thus leading to reduction in load, which each of the torque transmission units is to bear. As a result, use of the small-sized torque transmission units suffices. It is therefore possible to provide achievement of a reduced weight of the torque transmission apparatus and to decrease the thickness of the torque transmission apparatus, and more specifically, to achieve miniaturization of the apparatus in the direction of the central axis thereof.

The plurality of torque transmission units may be disposed at predetermined intervals on a predetermined circle placed between the reference plane of said first unit and the reference plane of said second unit.

There may be adopted a structure in which each of said plurality of torque transmission units further comprising:

(a) a first linear guide mechanism comprising:
  (i) a first rolling member running section provided in said first rail, said first rolling member running section extending along a longitudinal direction of said first rail;
  (ii) a first rolling member circulation passage provided in said connection block, said first rolling member circulation passage including a first loaded-rolling member running section serving as a counterpart relative to said first rolling member running section of said first rail; and
  (iii) a plurality of first rolling members received in said first rolling member circulation passage; and (b) a second linear guide mechanism comprising:
  (i) a second rolling member running section provided in said second rail, said second rolling member running section extending along a longitudinal direction of said second rail;
  (ii) a second rolling member circulation passage provided in said connection block, said second rolling member circulation passage including a second loaded-rolling member running section serving as a counterpart relative to said second rolling member running section of said second rail; and
  (iii) a plurality of second rolling members received in said second rolling member circulation passage.

The above-mentioned structure ensures a smooth movement of the driving unit, i.e., the first unit relative to the driven unit, i.e., the second unit.

There may be adopted a structure in which said second rail extends in a direction, which is substantially perpendicular to said predetermined direction along which said firs rail extends; and each of said first rail and said second rail is placed in a different position from a position corresponding to said prescribed circle.

The above-mentioned structure ensures a reliable transmission of torque from the driving unit, i.e., the first unit relative to the driven unit, i.e., the second unit.

Respective connection blocks of said plurality of torque transmission units may be connected to each other by a supporting member.

Connection of the connection blocks of the torque transmission units prevents these connection blocks from being away from each other, even when a centrifugal force is applied to them. This makes it possible to prevent the contact pressure between the connection block and the rail from being increased due to the centrifugal force as applied, and to prevent also load applied to the rolling members from being increased, thus ensuring rotation at high speed.

The apparatus according to the present invention may further comprise: a plurality of elastically deformable protection cover, with each of which each of said plurality of torque transmission units is surrounded.

According to the present invention, it is possible to prevent the entry of dust into the torque transmission units, thus permitting use of the apparatus in an appropriate manner even in a severe condition in which the apparatus is subject to exposure to mud or dust.

The apparatus according to the present invention may further comprises: at least one resilient member connected between said first unit and said second unit to impart a resilient force to said first unit and said second unit so as to recover a predetermined positional relationship between the central axis of said first unit and the central axis of said second unit.

According to the present invention, the second unit is connected to the first unit through the resilient member so as to be oscillatable. As a result, connecting a component on the side of the first unit, i.e., the driving unit (e.g., a motor for rotating the first and second units) to a base through another resilient member so as to be oscillatable makes it possible to attenuate oscillation of the side of the driven unit through oscillation of the side of the driving unit.

At least one of said first unit and said second unit may be provided with a plurality of recess-seats in each of which at least one of said first rail and said second rail, which corresponds thereto, is received.

According to the present invention, it is possible to decrease the distance between the first unit and the second unit by the depth of the recess-seat, thus decreasing the thickness of the torque transmission apparatus, and more specifically, achieving miniaturization of the apparatus in the direction of the central axis thereof.

There may be adopted a structure in which one of said first unit and said second unit is connected to one of said first rail and said second rail, which corresponds thereto, through fastening members; and an other of said first unit and said second unit is provided with a plurality of rail-receiving portions into each of which an other of said first rail and said second rail is movably fitted.

The above-mentioned structure enables the second unit to move slightly relative to the first unit in the direction of the central axis of the first unit, thus making it possible to absorb displacement of the second unit from the first unit in the above-mentioned direction. Even in case where spatial restriction in the torque transmission apparatus disables fastening members such as bolts from being used, it is possible to place the first rail on the first unit or the second rail on the second unit in an appropriate manner.

The apparatus according to the present invention may further comprise: an intermediate unit disposed between said first unit and said second unit, said intermediate unit having a first surface facing said first unit and a second surface facing said second unit; and wherein: each of said plurality of torque transmission units may comprise: a first rail mounted on said first surface of said intermediate unit, said first rail extending linearly in a predetermined direction; a first connection block mounted on said first unit to slidably support said first rail; a second rail mounted on said second surface of said intermediate unit, said second rail extending linearly in a different direction from said predetermined direction along which said first rail extends; and a second connection block mounted on said second unit to slidably support said second rail.

According to the present invention, it is possible to constitute the torque transmission apparatus, with the use of a standard liner guide, which is composed of a rail and a block connected slidably to the rail. As a result, the torque transmission apparatus can be manufactured at low cost. In addition, connecting the first connection block, the first and second rails and the second connection block to the first unit, the intermediate unit and the second unit, respectively, makes it possible to prevent the contact pressure between the first block and the first rail or the second block and the second rail from being increased due to the centrifugal force as applied, and to prevent also load applied to the rolling members from being increased.

There may be adopted a structure in which respective first rails of said plurality of torque transmission units are in parallel with each other; respective second rails of said plurality of torque transmission units are in parallel with each other; respective first connection blocks of said plurality of torque transmission units are disposed at predetermined intervals in a circumferential direction; and respective second connection blocks of said plurality of torque transmission units are disposed at predetermined intervals in a circumferential direction.

According to the present invention, it is possible to distribute load applied to the whole apparatus to the plurality of torque transmission units, thus leading to reduction in load, which each of the torque transmission units is to bear. As a result, use of the small-sized torque transmission units suffices. It is therefore possible to provide achievement of a reduced weight of the torque transmission apparatus and to decrease the thickness of the torque transmission apparatus, and more specifically, to achieve miniaturization of the apparatus in the direction of the central axis thereof.

There may be adopted a structure in which each of said plurality of torque transmission units further comprises:
(a) a first linear guide mechanism comprising:
 (i) a first rolling member running section provided in said first rail, said first rolling member running section extending along a longitudinal direction of said first rail;
 (ii) a first rolling member circulation passage provided in said first connection block, said first rolling member circulation passage including a first loaded-rolling member running section serving as a counterpart relative to said first rolling member running section of said first rail; and
 (iii) a plurality of first rolling members received in said first rolling member circulation passage; and
(b) a second linear guide mechanism comprising:
 (i) a second rolling member running section provided in said second rail, said second rolling member running section extending along a longitudinal direction of said second rail;
 (ii) a second rolling member circulation passage provided in said second connection block, said second rolling member circulation passage including a second loaded-rolling member running section serving as a counterpart relative to said second rolling member running section of said second rail; and
 (iii) a plurality of second rolling members received in said second rolling member circulation passage.

At least one of said first unit and said second unit may be provided with a plurality of recess-seats in each of which at least one of said first connection block and said second connection block, which corresponds thereto, is received.

According to the present invention, it is possible to decrease the distance between the first unit and the second unit by the depth of the recess-seat, thus decreasing the thickness of the torque transmission apparatus, and more specifically, achieving miniaturization of the apparatus in the direction of the central axis thereof.

There may be adopted a structure in which one of said first unit and said second unit is connected to one of said first connection block and said second connection block, which corresponds thereto, through fastening members; and an other of said first unit and said second unit is provided with a plurality of block-receiving portions into each of which an other of said first connection block and said second connection block is movably fitted.

The above-mentioned structure enables the second unit to move slightly relative to the first unit in the direction of the central axis of the first unit, thus making it possible to absorb displacement of the second unit from the first unit in the above-mentioned direction. Even in case where spatial restriction in the torque transmission apparatus disables fastening members such as bolts from being used, it is possible to place the first rail on the first unit or the second rail on the second unit in an appropriate manner.

There may be adopted a structure in which said plurality of torque transmission units comprises: a first sub-unit comprising a plurality of first rails for said first unit, said first rails being in parallel with each other; and a second sub-unit comprising a plurality of second rails for said second unit, said second rails being in parallel with each other, said second rails apparently intersecting said first rails at different positions from the central axis of said first unit.

According to the present invention, it is possible to distribute load applied to the whole apparatus to the plurality of torque transmission units, thus leading to reduction in load, which each of the torque transmission units is to bear. As a result, use of the small-sized torque transmission units suffices. It is therefore possible to provide achievement of a reduced weight of the torque transmission apparatus and to decrease the thickness of the torque transmission apparatus, and more specifically, to achieve miniaturization of the apparatus in the direction of the central axis thereof.

The apparatus according to the present invention may further comprise: an intermediate unit disposed between said first unit and said second unit, and wherein: said plurality of torque transmission units may comprise: a plurality of first leaf springs for connecting said first unit and said intermediate unit so as to enable a relative displacement between said first unit and said intermediate unit in a first direction perpendicular to the central axis of said first unit; and a plurality of second leaf springs for connecting said second unit and said intermediate unit so as to enable a relative displacement between said second unit and said intermediate unit in a second direction, which is different from said first direction.

According to the present invention, torque is transmitted from the first unit to the second unit through shearing stress applied to the first and second leaf springs.

An extended plane of each of the plurality of first leaf springs may intersect an extended plane of each of the plurality of second leaf springs at right angles so that said first direction intersects said second direction at right angles.

Such a structure enables displacement of the second unit from the first unit in any direction, which is perpendicular to the central axis of the first unit.

There may be adopted a structure in which said plurality of first leaf springs connects said first unit and said intermediate unit to each other at respective opposite ends thereof in said first direction; and said plurality of second leaf springs connects said second unit and said intermediate unit to each other at respective opposite ends thereof in said second direction.

Such a structure makes it possible to increase the distance between each of the first and second leaf springs and the central axis of the first unit, thus permitting transmission of a large torque through shearing stress applied to these leaf springs. Accordingly, miniaturization of the torque transmission apparatus can be provided.

Each of said plurality of first leaf springs and said plurality of second leaf springs may have a U-shaped cross section.

Such a structure makes it possible to increase in amount of displacement between the first unit and the second unit in the direction of the central axis of the first unit.

One of said first unit and said second unit may have an opening in which an other of said first unit and said second unit is received.

Such a structure makes it possible to decrease the thickness of the torque transmission apparatus in the direction of the central axis of the first unit.

The intermediate unit may have an opening in which the other of said first unit and said second unit is received, said intermediate unit being received in said opening of said one of said first unit and said second unit.

Such a structure makes it possible to further decrease the thickness of the torque transmission apparatus in the direction of the central axis of the first unit.

The apparatus according to the present invention may further comprise: at least one spline connection mechanism provided in at least one of said first unit and said second unit, said at least one spline connection mechanism enabling at least one of said first unit and said second unit to be displaced in a direction of the central axis thereof.

Elastic deformation of the first and second leaf springs causes variation in distance between the first unit and the second unit in the direction of the central axis of the first unit. The spline connection mechanism as provided absorbs the above-mentioned variation in distance.

The at least one spline connection mechanism may comprise: an inner circumferential member, which is provided on an inner circumferential surface thereof with key grooves extending in parallel with the central axis of said at least one of said first unit and said second unit; an outer circumferential member, which is provided on an outer circumferential surface thereof with counter-key grooves extending in parallel with said central axis; and a plurality of rolling members received between said key grooves and said counter-key grooves so as to be capable of rolling.

According to the present invention, the spline connection mechanism permits transmission of torque and also enables at least one of the first unit and the second unit to be displaced in the direction of the central axis of the first unit.

BRIEF DESCRIPTION OF THE DRAWINGS

FIG. 20 is a perspective view illustrating the torque transmission apparatus according to the fifth embodiment of the present invention, which is partially broken;

DESCRIPTION OF THE PREFERRED EMBODIMENTS

Now, embodiments of a torque transmission apparatus of the present invention will be described in detail below with reference to the accompanying drawings.

Figure 1:
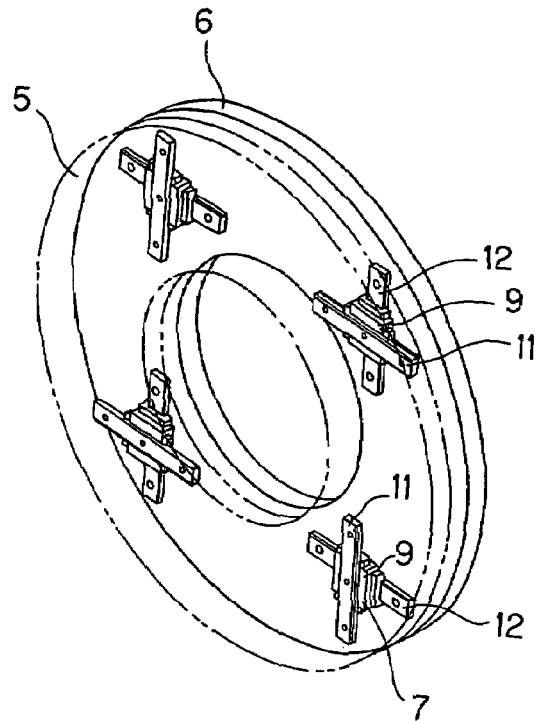
FIG. 1 is a perspective view illustrating a torque transmission apparatus according to the first embodiment of the present invention.
Figure 2:
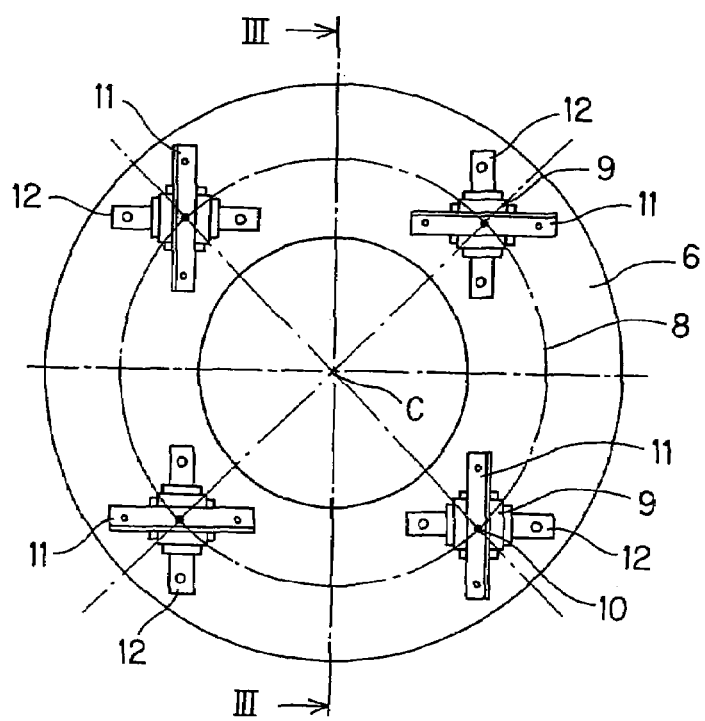
FIG. 2 is a front view of the torque transmission apparatus according to the first embodiment of the present invention.
Figure 3:
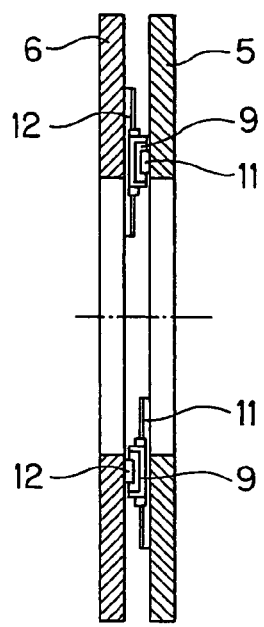
FIG. 3 is a cross-sectional view cut along the line III-III in FIG. 2.

FIGS. 1 to 3 show the torque transmission apparatus of the first embodiment of the present invention. FIG. 1 is a perspective view of the torque transmission apparatus, FIG. 2 is a front view of the apparatus and FIG. 3 is across-sectional view cut along the line III-III in FIG. 2. A driving disc 5 serving as a driving unit, i.e., the first unit is shown in phantom lines in FIG. 1, and the driving disc 5 is removed from FIG. 2, in order to facilitate understanding of the structure of the apparatus.

The torque transmission apparatus transmits torque from the driving disc 5, which is connected to a power source such as a motor, to a driven disc 6 serving as a driven unit, i.e., the second unit. A plurality of torque transmission units 7 . . . 7, for example, four torque transmission units are disposed between the driving disc 5 and the driven disc 6.

The driving disc 5 is formed into a ring-shape having a relatively small thickness, in order to reduce its weight. The driven disc 6 is also formed into the same ring-shape as the driving disc 5. The plurality of torque transmission units 7 . . . 7 is placed at different positions from the central axis of the driving disc 5. More specifically, the torque transmission units 7 . . . 7 are placed at regular intervals on a circle 8, which is concentric with the central axis of the driving disc 5 as shown also in FIGS. 2 and 3. When the central axis of the driving disc 5 and the central axis of the driven disc 6 are coincide with each other, an apparent intersection point between a driving-side rail 11, i.e., the first rail and a driven-side rail 12, i.e., the second rail of each of the toque transmission units 7 . . . 7, in other words, a center of a connection block 9 of each of these units 7 . . . 7 is placed on the above-mentioned circle 8.

The torque transmission unit 7 is composed of the driving-side rail 11 mounted on the driving disc 5, a driven-side rail 12 mounted on the driven disc 6, and a connection block 9 for connecting the driving-side rail 11 and the driven-side rail 12 to each other so as to be slidable relative to these rails 11, 12. The driving-side rail 11 and the driven-side rail 12 are spaced apart from each other in the direction, which is in parallel with the central axis of the driving disc 1, but the driving-side rail 11 apparently intersects, at right angles in the first embodiment of the present invention, the driven-side rail 2 in the front view of the apparatus, i.e., FIG. 2.

Each of the driving-side rail 11 and the driven-side rail 12 extends in the different direction from the direction of a tangential line to the above-mentioned circle 8. More specifically, the direction along which the driving-side rail 11 extends, intersects the tangential line to the circle 8 for example at an angle of 45 degrees. The direction along which the driven-side rail 12 extends, also intersects the tangential line to the circle 8 for example at an angle of 45 degrees. As shown in FIGS. 1 and 2, of the four driving-side rails 12, a pair of driving-side rails 12 placed diagonally extend in parallel with each other, on the one hand, and extended lines of the adjacent two driving-side rails 12 intersects each other at right angles.

Figure 4:
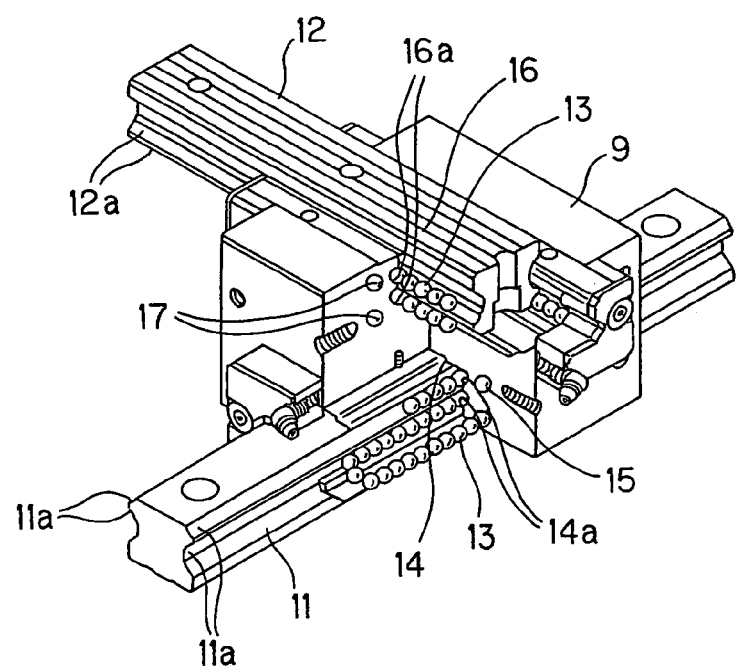
FIG. 4 is a perspective view illustrating the detailed structure of a torque transmission unit, which is partially broken to expose an internal structure.

FIG. 4 shows the detailed structure of each of the torque transmission units 7 . . . 7. The driving-side rail 11 is provided with four ball-running grooves 11a . . . 11a serving as the first rolling member running sections in which balls 13 . . . 13 serving as the rolling member travel, which sections are formed so as to extend in the longitudinal direction of the driving-side rail 11. The driven-side rail 12 is also provided with four ball-running groove 12a . . . 12a serving as the second rolling member running sections in which balls 13 . . . 13 serving as the rolling member travel, which sections are formed so as to extend in the longitudinal direction of the driven-side rail 12.

The connection block 9, which is formed into a rectangular parallelepiped, is provided at one of the opposite sides thereof with the first recess 14 in which the driving-side rail 11 is slidably received. The connection block 9 is also provided at its portion defining the first recess 14 with four loaded-ball-running grooves 14a . . . 14a serving as the first loaded-rolling member running sections, which serve as the counter part relative to the above-mentioned four ball-running grooves 11a . . . 11a. In addition, the connection block 9 is also provided not only with four ball returning paths 15 . . . 15, which are formed in parallel with the above-mentioned loaded-ball-running grooves 14a . . . 14a, but also with pairs of U-shaped direction change paths, each pair of which connects the opposite ends of the respective loaded-ball-running groove 14a to the opposite ends of the respective ball returning path 15. The loaded-ball-running groove 14a, the ball returning path 15 and a pair of direction change paths constitutes a single elliptic ball circulation passage serving as the first rolling member circulation passage in which the balls travel. The four ball circulation passages are provided in accordance with the number of the ball-running grooves 11a . . . 11a formed on the driving-side rail 11. The number of the ball-running grooves 11a . . . 11a and arrangement thereof are determined based on magnitude of load and directions thereof.

The ball-running grooves 11a . . . 11a serving as the first rolling member running section, the ball circulation passage serving as the first rolling member circulation section, and the balls 13 . . . 13 serving as the rolling member constitute the first linear guide mechanism for each of the torque transmission units 7 . . . 7.

The connection block 9 is further provided at the other of the opposite sides thereof with the second recess 16 in which the driven-side rail 12 is slidably received. The extending direction of the second recess 16 for the driven-side rail 12 apparently intersects the extending direction of the above-mentioned first recess 14 for the driving-side rail 11 at right angles. The connection block 9 is also provided at its portion defining the second recess 16 with four loaded-ball-running grooves 16a . . . 16a serving as the second loaded-rolling member running sections, which serve as the counter part relative to the above-mentioned four ball-running grooves 12a . . . 12a. In addition, the connection block 9 is also provided not only with four ball returning paths 17 . . . 17, which are formed in parallel with the above-mentioned loaded-ball-running grooves 16a . . . 16a, but also with pairs of U-shaped direction change paths, each pair of which connects the opposite ends of the respective loaded-ball-running groove 16a to the opposite ends of the respective ball returning path 17. The loaded-ball-running groove 16a, the ball returning path 17 and a pair of direction change paths constitutes a single elliptic ball circulation passage serving as the second rolling member circulation passage in which the balls travel. The four ball circulation passages are provided in accordance with the number of the ball-running grooves 12a . . . 12a formed on the driven-side rail 12. The number of the ball-running grooves 12a . . . 12a and arrangement thereof are determined based on magnitude of load and directions thereof.

The ball-running grooves 12a . . . 12a serving as the second rolling member running section, the ball circulation passage serving as the second rolling member circulation section, and the balls 13 . . . 13 serving as the rolling member constitute the first second guide mechanism for each of the torque transmission units 7 . . . 7.

The balls may travel between the ball-running grooves of the driving-side and driven-side rails 11, 12 and the loaded-ball-running grooves of the connection block 9, not in an endlessly circulating manner, but in a reciprocating manner. In this case, the reciprocating motion of the balls puts restrictions on a range in which the connection block 9 can move relative to the driving-side rail 11 or the driven-side rail 12.

The above-described structure ensures not only a smooth slide of the connection block 9 relative to the driving-side rail 11 in the direction along which the driving-side rail 11 extends, but also a smooth slide of the connection block 9 relative to the driven-side rail 12 in the direction along which the driven-side rail 12 extends. It is therefore possible to provide a relative movement between the driving-side rail 11 and the driven-side rail 12, which apparently intersect each other at right angles, on a plane defined by these rails.

Rotation of the driving disc 5 caused by actuating the power source such as a motor causes torque from the driving disc 5 to be transmitted to the driven disc 6 through the torque transmission units 7 . . . 7 in each of which the driving-side rail 11 is kept in an apparently perpendicular state to the driven-side rail 12, to rotate the driven disc 6 in the same angular velocity as the driving disc 5.

Figure 5:
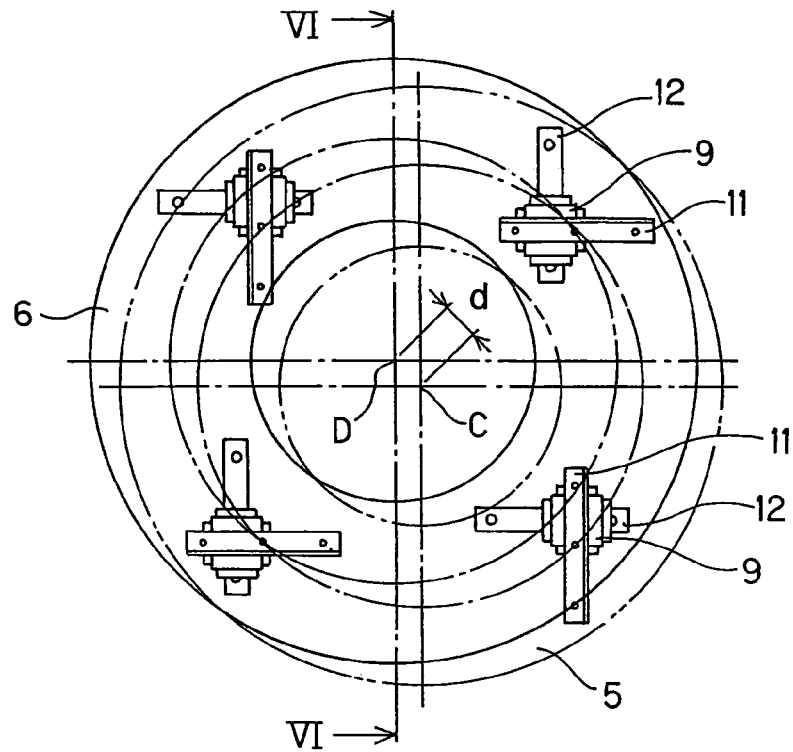
FIG. 5 is a front view illustrating a state in which there occurs a relative displacement between the central axis of the first unit, i.e., a driving disc and the central axis of the second unit, i.e., a driven disc of the torque transmission apparatus according to the first embodiment of the present invention.
Figure 6:
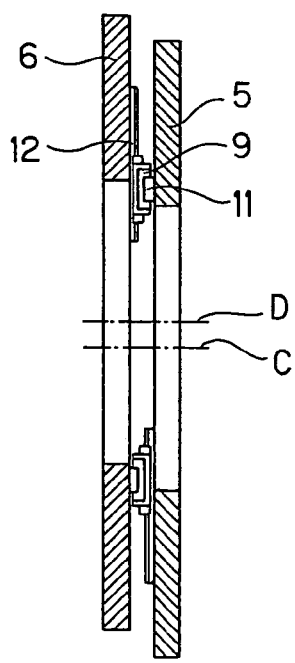
FIG. 6 is a cross-sectional view cut along the line VI-VI in FIG. 5.

FIGS. 5 and 6 show a displacement state in which the central axis "C" of the driving disc 5 and the central axis "D" of the driven disc 6 are displaced from each other by the distance "d". The driven-side rail 12 is movable relative to the driving-side rail 11 in the state in which these rails 11 and 12 are kept in perpendicular to each other, with the result that the driven disc 6 is movable relative to the driving disc 5 so as to keep a posture in which these discs 5 and 5 are in parallel with each other. More specifically, the relative movement between the driving disc 5 and the driven disc 6 is permitted in a state the central axis "C" of the driving disc 5 is kept in parallel with the central axis of the driven disc 6.

The first embodiment of the present invention, in which the plurality of torque transmission units 7 . . . 7 is placed at the regular intervals on the circle 8, which is away from the central axis "C" of the driving disc 5, makes it possible to reduce load, which is born by each of the torque transmission units 7 . . . 7, with the result that the torque transmission units 7 . . . 7 each having a smaller size suffice. It is therefore possible to provide achievement of a reduced weight of the torque transmission apparatus and to decrease the thickness of the torque transmission apparatus, and more specifically, to achieve miniaturization of the apparatus in the direction of the central axis "C" of the driving disc 5.

Figure 11:
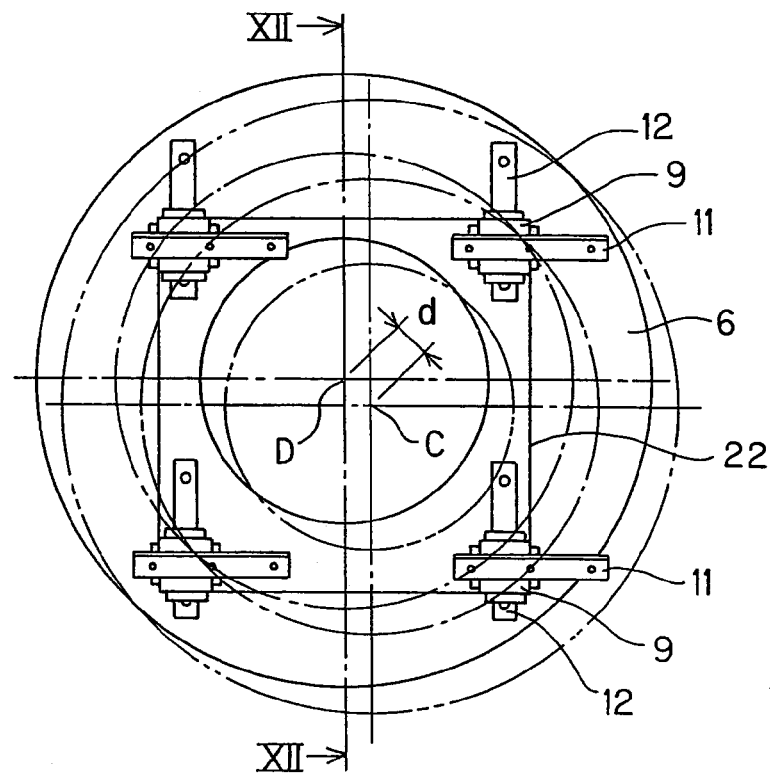
FIG. 11 is a front view illustrating a state in which there occurs a relative displacement between the central axis of the first unit, i.e., a driving disc and the central axis of the second unit, i.e., a driven disc of the torque transmission apparatus according to the second embodiment of the present invention.

In the first embodiment of the present invention, of the four driving-side rails 12, the pair of driving-side rails 12 placed diagonally extend in parallel with each other, on the one hand, and extended lines of the adjacent two driving-side rails 12 intersects each other at right angles. As a result, only the pair of connection blocks 9, 9 placed diagonally behaves in the same manner, but in the different manner from the adjacent two connection blocks 9, 9, as shown in FIG. 5, although all of the connection blocks 9 . . . 9 behave in the same manner as shown in FIG. 11. Such a specific structure makes it possible to improve the balance in weight of the apparatus when the displacement between the driving disc 5 and the driven disc 6 occurs, in comparison with a case where all of the connection blocks 9 . . . 9 behave in the same manner.

Figure 7:
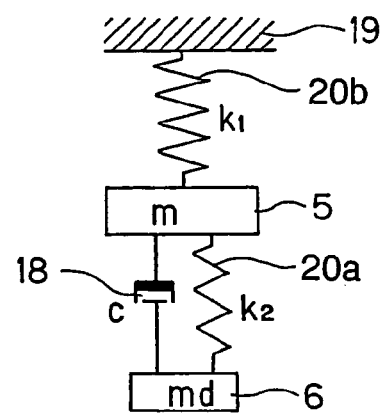
FIG. 7 is a schematic diagram showing a case in which a resilient member is connected between the first unit and the second unit.

There may be provided a resilient member such as a spring 20a to impart, when the central axis "D" of the driven disc 6 is displaced from the central axis "C" of the driving disc 5, a resilient force to the driving disc 5 and the driven disc 6 so as to cause the central axis "D" of the driven disc 6 to return to the original position, as an occasion demands. In addition, a damper to attenuate power of displacement may be provided. FIG. 7 is a schematic diagram showing addition of the spring 20a and the damper 18. As shown in FIG. 7, the side of the driving disc 5 (i.e., the driving power source such as the motor to rotate the driving disc 5 and the driven disc 6) may be connected to a base 19 through another spring 20b so as to be oscillatable.

In the above-described structure in which the driving disc 5 and the driven disc 6 are connected to each other through the spring 20a and the damper 18, even when an impact is given to the driven disc 6, the impact as given to the driven disc 6 is not transmitted directly to the driving disc 5. In addition, when the driven disc 6 is oscillated, mass of the side of the driving disc 5 serves as a balancer, thus making it possible to attenuate oscillation of the side of the driven disc 6 through oscillation of the side of the driving disc 5.

Figure 8:
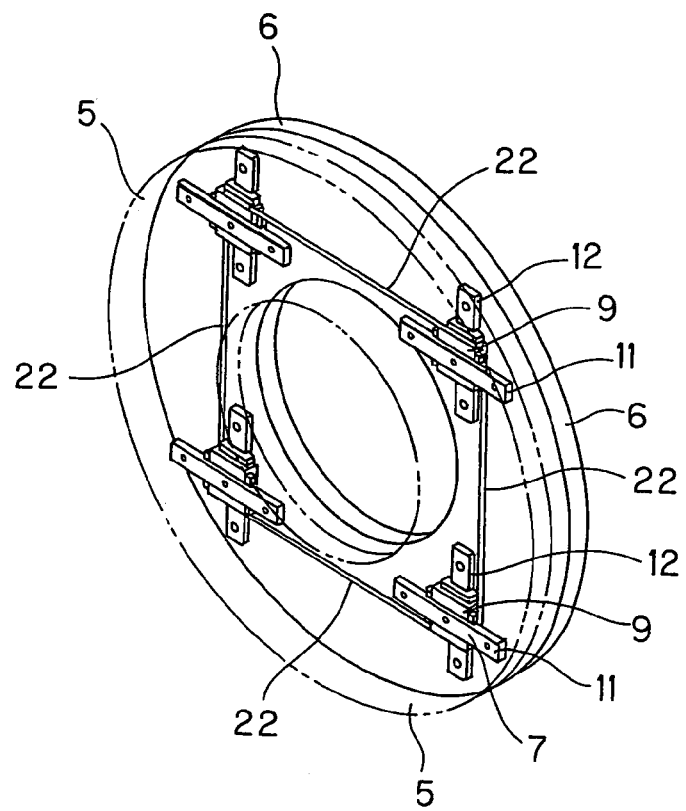
FIG. 8 is a perspective view illustrating the torque transmission apparatus according to the second embodiment of the present invention.
Figure 9:
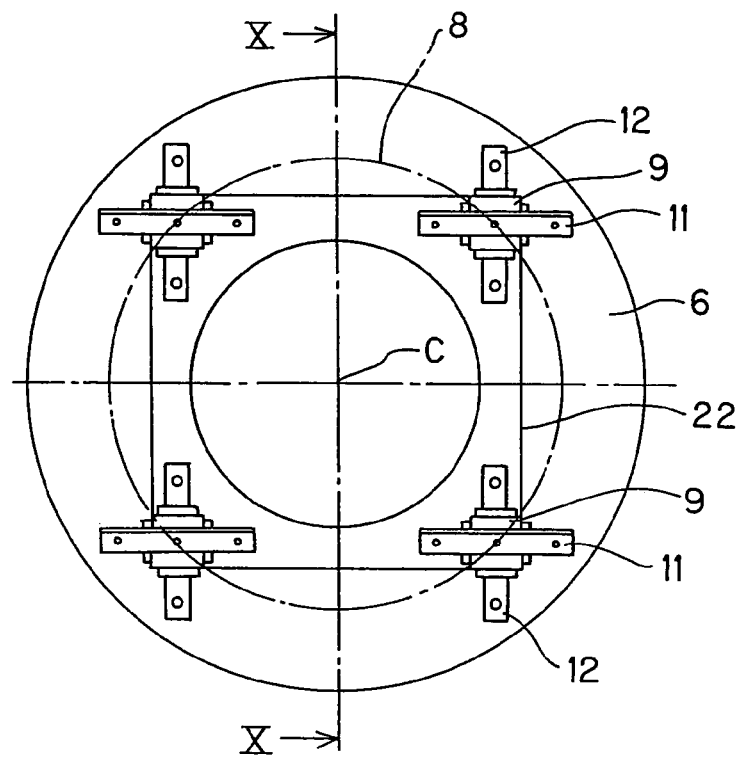
FIG. 9 is a front view of the torque transmission apparatus according to the second embodiment of the present invention.
Figure 10:
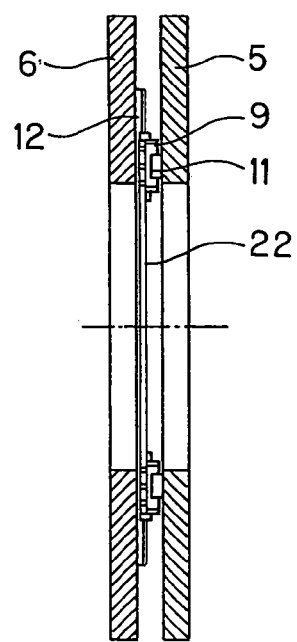
FIG. 10 is a cross-sectional view cut along the line X-X in FIG. 9.

FIGS. 8 and 9 show the torque transmission apparatus according to the second embodiment of the present invention. FIG. 8 is a perspective view illustrating the torque transmission apparatus according to the second embodiment of the present invention; FIG. 9 is a front view of the torque transmission apparatus; and FIG. 10 is a cross-sectional view cut along the line X-X in FIG. 9. The driving disc 5 is shown in phantom lines in FIG. 8, and the driving disc 5 is removed from FIG. 9, in order to facilitate understanding of the structure of the apparatus. The torque transmission apparatus according to the second embodiment of the present invention also transmits torque from the driving disc 5 to the driven disc 6. A plurality of torque transmission units 7 . . . 7, for example, four torque transmission units are disposed between the driving disc 5 and the driven disc 6. The plurality of torque transmission units 7 . . . 7 are placed at regular intervals on a circle 8, which is concentric with the central axis "C" of the driving disc 5, as shown in FIG. 9.

The torque transmission unit 7 is composed of the driving-side rail 11 mounted on the driving disc 5, the driven-side rail 12 mounted on the driven disc 6, and the connection block 9 for connecting the driving-side rail 11 and the driven-side rail 12 to each other so as to be slidable relative to these rails 11, 12. Each of the torque transmission units 7 . . . 7 has the same structure as that of the first embodiment of the present invention, the same reference numerals are given to the same structural components, and description thereof is omitted.

In the second embodiment of the present invention, all the driving-side rails 11 are mounted on the driving disc 5 so as to be in parallel with each other, and all the driven-side rails 12 are mounted on the driven disc 6 so as to be in parallel with each other. The connection blocks 9 . . . 9 are connected to each other by strip-shaped supporting members 22 . . . 22. In the second embodiment, the supporting members 22 . . . 22 are assembled into a rectangular framework at each corner portion of which the respective connection block 9 . . . 9 is placed.

Rotation of the driving disc 5 causes a centrifugal force to be applied to the torque transmission units 7 . . . 7, which are apart from the central axis "C" of the driving disc 5. The driving-side rails 11 and the driven-side rails 12 are fixed on the driving disc 5 and the driven disc 6, respectively, with the result that force to move the connection blocks 9 . . . 9 outwardly is applied to these blocks 9 . . . 9. The above-mentioned centrifugal force is increased by load applied to the balls 13 . . . 13 placed between the connection block and the rails 11 and 12. Connection of the connection blocks 9 . . . 9 by the supporting members 22 prevents the connection blocks 9 . . . 9 from moving outwardly, even when the centrifugal force is applied to the connection blocks 9 . . . 9. As a result, the load applied to the balls 13 . . . 13 is not increased due to the application of the centrifugal force, thus permitting rotation at high rotational speed.

Figure 12:
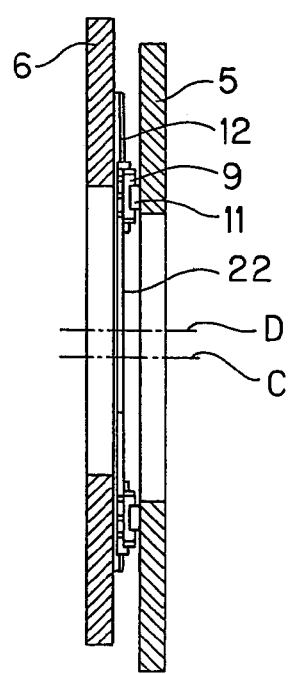
FIG. 12 is a cross-sectional view cut along the line XII-XII in FIG. 9.

FIGS. 11 and 12 show a displacement state in which the central axis "C" of the driving disc 5 and the central axis "D" of the driven disc 6 are displaced from each other by the distance "d". In the second embodiment of the present invention, all the driving-side rails 11 are mounted on the driving disc 5 so as to be in parallel with each other, and all the driven-side rails 12 are mounted on the driven disc 6 so as to be in parallel with each other, as described above. Accordingly, all the connection blocks 9 . . . 9 of the torque transmission units 7 . . . 7 behave in the same manner so as to maintain a proper connection of the connecting blocks 9 . . . 9, even when the central axis "C" of the driving disc 5 and the central axis "D" of the driven disc 6 are displaced from each other.

Figure 13:
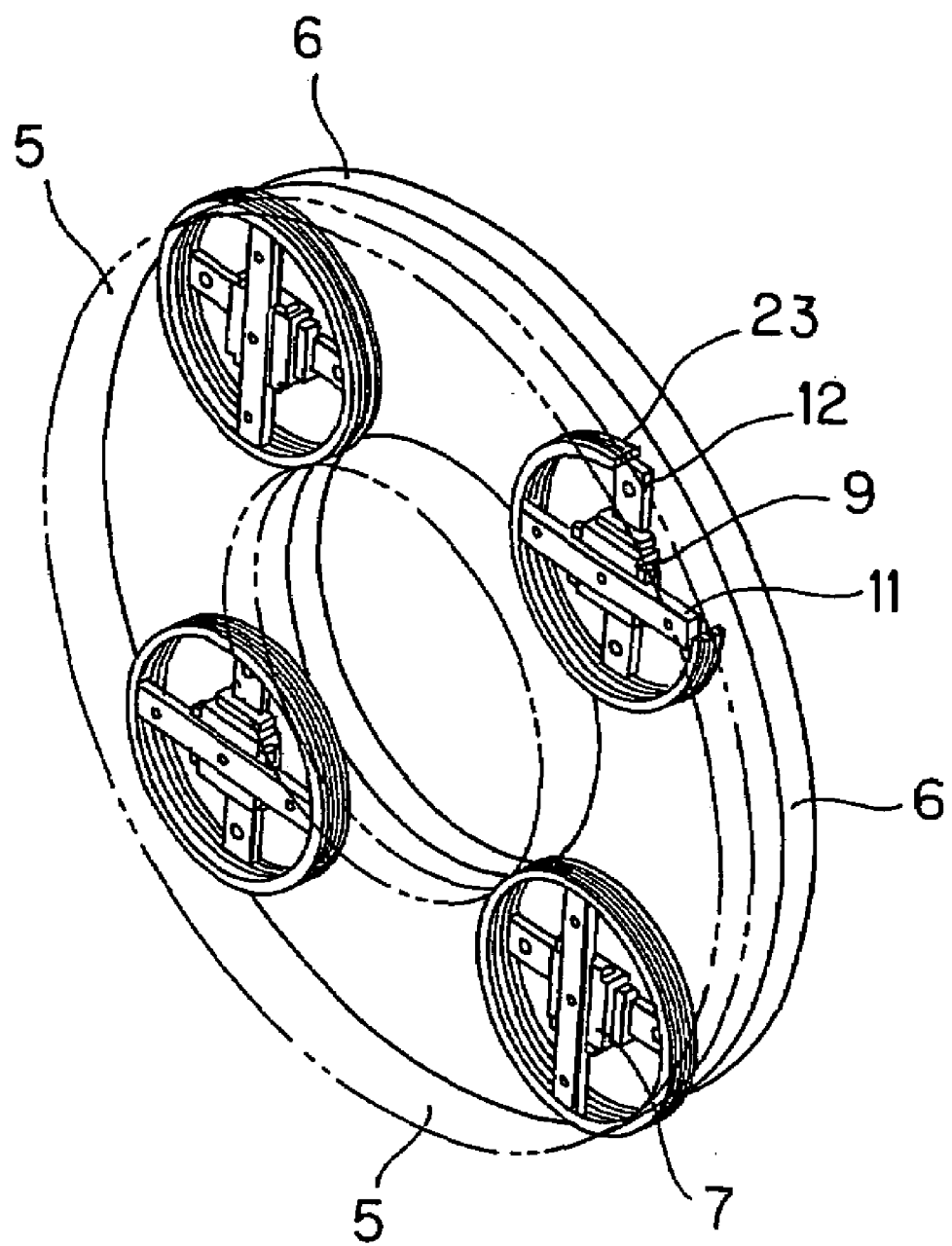
FIG. 13 is a perspective view illustrating the torque transmission apparatus according to the third embodiment of the present invention.
Figure 14:
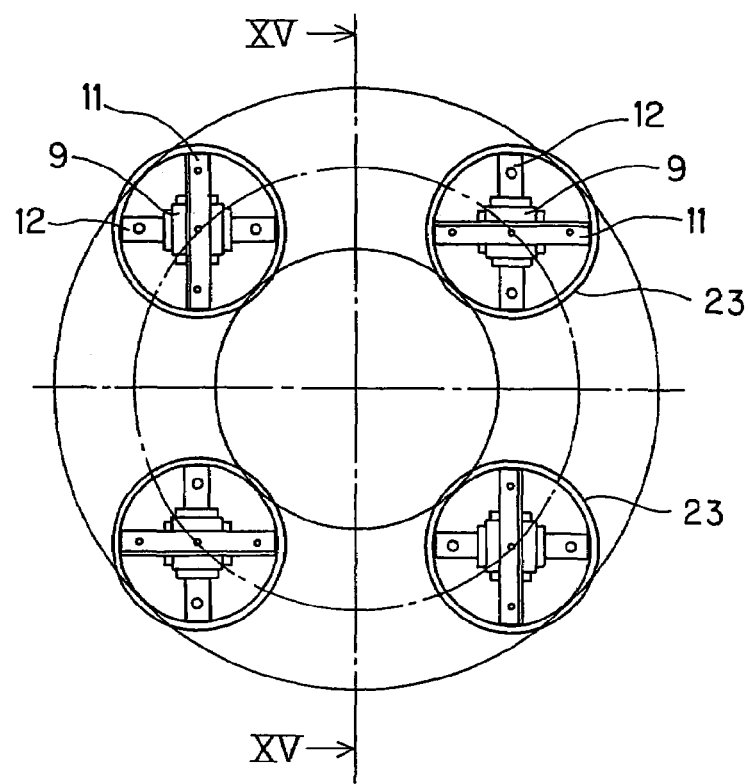
FIG. 14 is a front view of the torque transmission apparatus according to the third embodiment of the present invention.
Figure 15:
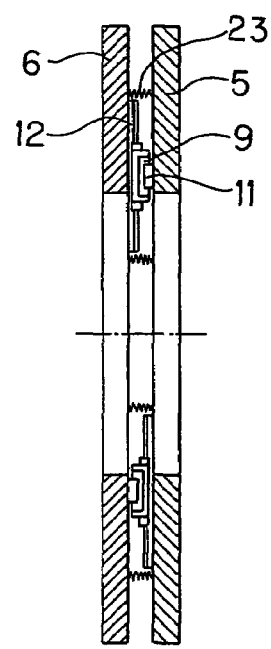
FIG. 15 is a cross-sectional view cut along the line XV-XV in FIG. 14.

FIGS. 13 and 14 show the torque transmission apparatus according to the third embodiment of the present invention. FIG. 13 is a perspective view illustrating the torque transmission apparatus according to the third embodiment of the present invention; FIG. 14 is a front view of the torque transmission apparatus; and FIG. 15 is a cross-sectional view cut along the line XV-XV in FIG. 14. The driving disc 5 is shown in phantom lines in FIG. 13, and the driving disc 5 is removed from FIG. 14, in order to facilitate understanding of the structure of the apparatus. The torque transmission apparatus according to the third embodiment of the present invention also transmits torque from the driving disc 5 to the driven disc 6. A plurality of torque transmission units 7 . . . 7, for example, four torque transmission units are disposed between the driving disc 5 and the driven disc 6. Each of the torque transmission units 7 . . . 7 has the same structure as that of the first embodiment of the present invention, the same reference numerals are given to the same structural components, and description thereof is omitted.

Figure 16:
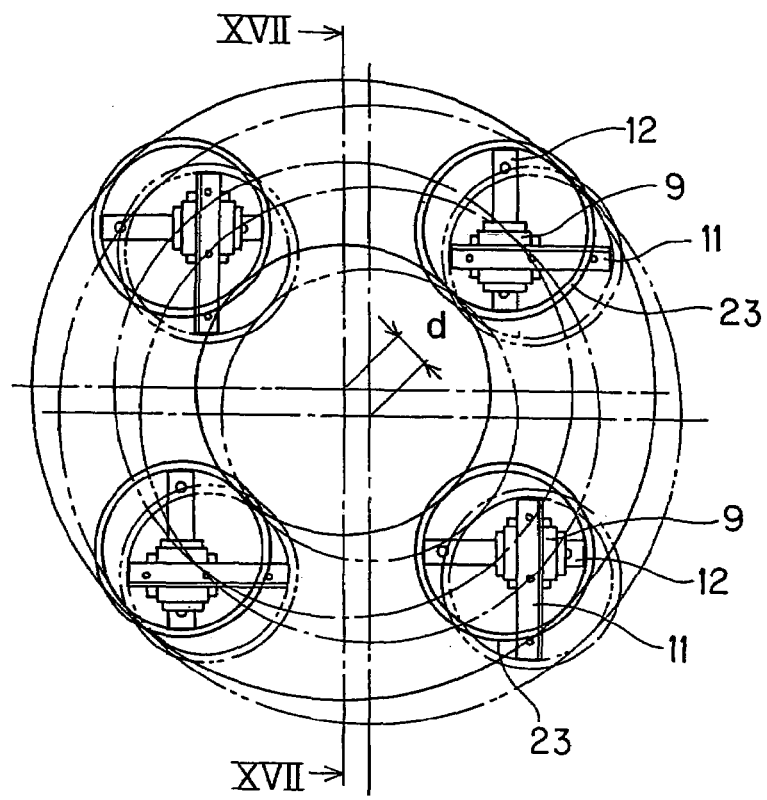
FIG. 16 is a front view illustrating a state in which there occurs a relative displacement between the central axis of the first unit, i.e., a driving disc and the central axis of the second unit, i.e., a driven disc of the torque transmission apparatus according to the third embodiment of the present invention.
Figure 17:
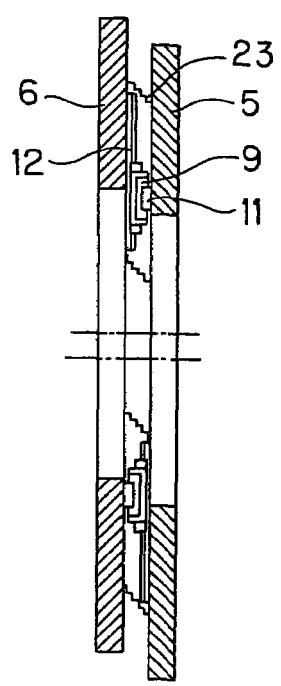
FIG. 17 is a cross-sectional view cut along the line XVII-XVII in FIG. 16.

The third embodiment of the present invention differs from the first embodiment of the present invention in that each of the torque transmission units 7 . . . 7 is surrounded with an elastically deformable protection cover, e.g., a bellows 23. One end of the bellows 23 is connected to the driving disc 5 and the other end thereof is connected to the driven disc 6. The bellows 23 permits displacement of the driven disc 6 from the driving disc 5 as shown in FIGS. 16 and 17. The bellows 23 prevents the entry of dust into the torque transmission units, thus permitting use of the apparatus in an appropriate manner even in a severe condition in which the apparatus is subject to exposure to mud or dust.

Figure 18B:
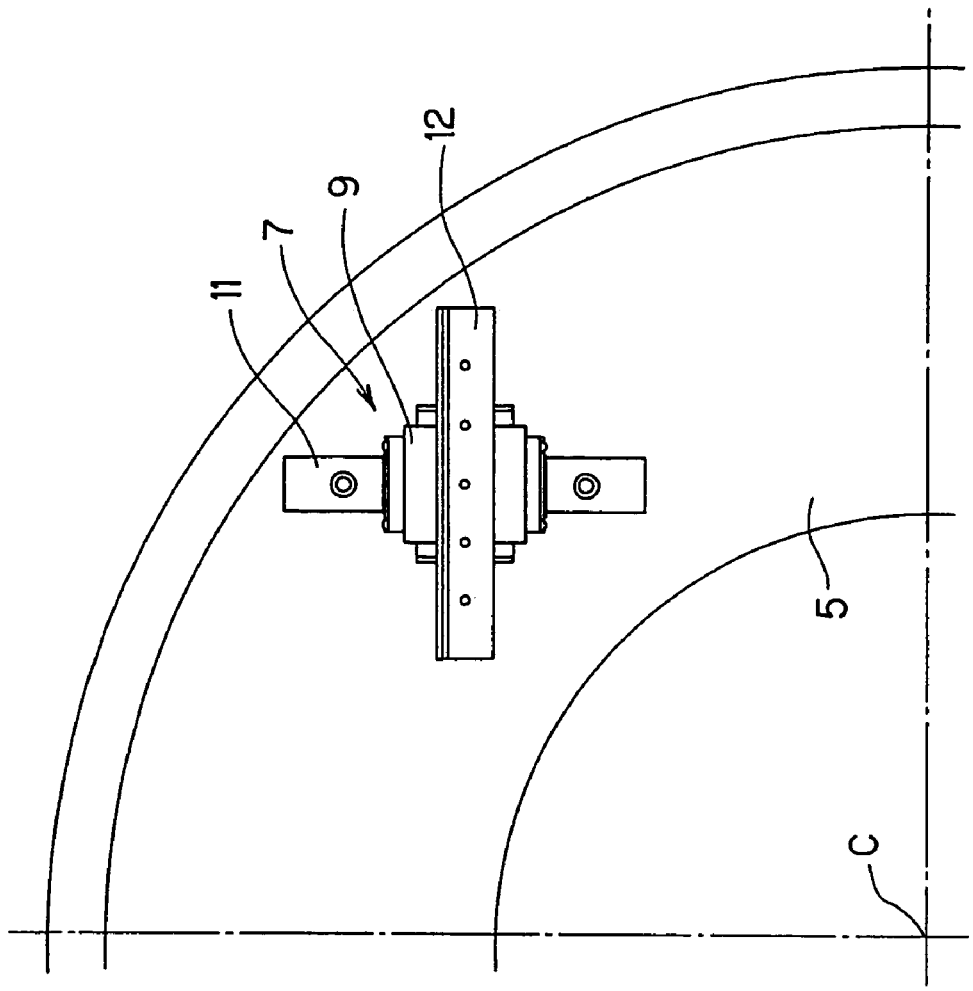
FIG. 18(A) is a cross-sectional view of a quarter of the torque transmission apparatus according to the fourth embodiment of the present invention and FIG. 18(B) is a partial front view of the quarter thereof.
Figure 18A:
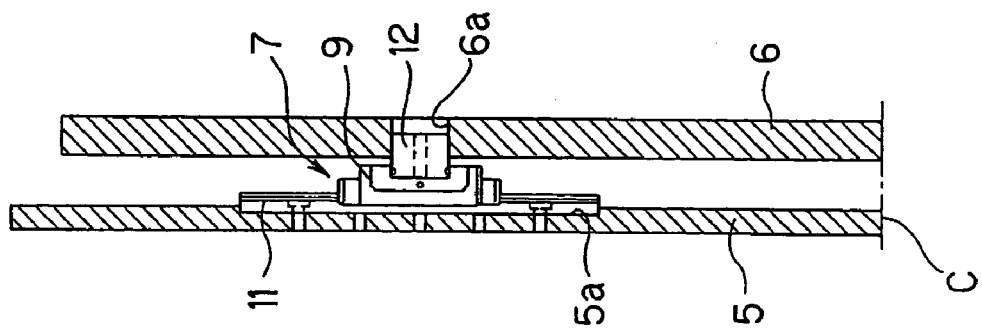

FIGS. 18(A) and 18(B) show the torque transmission apparatus according to the third embodiment of the present invention. FIG. 18(A) is a cross-sectional view of a quarter of the torque transmission apparatus according to the fourth embodiment of the present invention and FIG. 18(B) is a partial front view of the quarter thereof. The driving disc 5 is removed from FIG. 18(B), in order to facilitate understanding of the structure of the apparatus.

The torque transmission apparatus according to the fourth embodiment of the present invention also transmits torque from the driving disc 5, which is connected to the power source such as a motor, to the driven disc 6 serving as the driving unit. A plurality of torque transmission units 7 . . . 7, for example, four torque transmission units are disposed between the driving disc 5 and the driven disc 6.

The plurality of torque transmission units 7 . . . 7 is placed at different positions from the central axis of the driving disc 5. More specifically, the torque transmission units 7 . . . 7 are placed at regular intervals on the circle, which is concentric with the central axis of the driving disc 5 as shown also in FIG. 18 (B). When the central axis of the driving disc 5 and the central axis of the driven disc 6 are coincide with each other, an apparent intersection point between a driving-side rail 11, i.e., the first rail and a driven-side rail 12, i.e., the second rail of each of the toque transmission units 7 . . . 7, in other words, a center of a connection block 9 of each of these units 7 . . . 7 is placed on the above-mentioned circle.

Each of the torque transmission units 7 . . . 7 has the same structure as that of the first embodiment of the present invention, the same reference numerals are given to the same structural components, and description thereof is omitted.

The fourth embodiment of the present invention differs from the first embodiment of the present invention in that the driving disc 5 is provided with recess-seats 5a for the driving-side rails 11. The driving-side rail 11 is fitted into the recess-seat 5a and connected to the driving-side rail 11 by fastening members such as bolts. The driven disc 6 is provided with through-holes 6a, serving as rail-receiving portions, which pass through the driven disc 6. The driven-side rail 12 is movably fitted into the above-mentioned through-hole 6a, without being fixed by any fastening members such as bolts. The fourth embodiment of the present invention is not limited only to the fitting of the driven-side rail 12 into the through-hole 6a formed in the driven disc 6. The driven disc 6 may be provided with rail-receiving recess in place of the through-holes 6a, serving as the rail-receiving portions. The structure, in which the driven-side rail 12 can move in the direction of the central axis of the driven disc 6, suffices. Connection of the driving-side rails 11 to the driving disc 5 by the fastening members enables torque from the driving disc 5 to be transferred to the torque transmission units 7 . . . 7. Fitting the driven-side rails 12 into the through-holes 6a of the driven disc 6 enables torque from the torque transmission units 7 . . . 7 to the driven disc 6.

According to the above-mentioned forth embodiment of the present invention, it is possible to decrease the distance between the driving disc 5 and the driven disc 6 by the total depth of the recess-seat 5a and the through-hole 6a, thus decreasing the thickness of the torque transmission apparatus. In addition, the driven disc 6 can move slightly relative to the driving disc 5 in the direction of the central axis of the driving disc 5, thus making it possible to absorb displacement of the driven disc 6 from the driving disc 5 in the above-mentioned direction. Even in case where spatial restriction in the torque transmission apparatus disables fastening members such as bolts from being used, it is possible to place the driving-side rail 11 on the driving disc 5 and the driven-side rail 12 on the driven disc 6 in an appropriate manner.

Figure 19B:
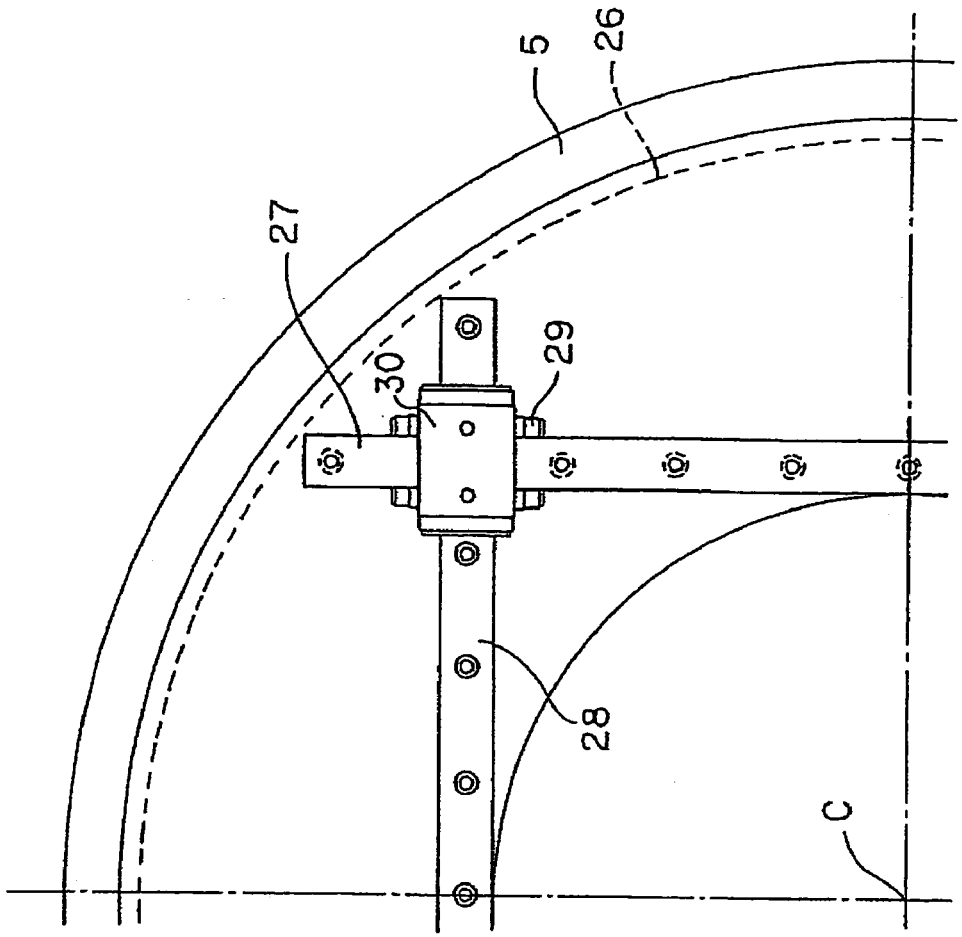
FIG. 19(A) is a cross-sectional view of a quarter of the torque transmission apparatus according to the fifth embodiment of the resent invention and FIG. 19(B) is a partial front view of the quarter thereof.
Figure 19A:
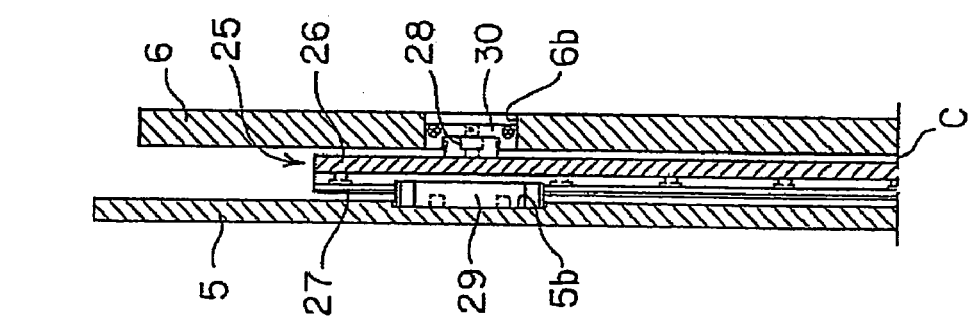

FIGS. 19(A) and 19(B) show the torque transmission apparatus according to the fifth embodiment of the present invention. FIG. 19(A) is a cross-sectional view of a quarter of the torque transmission apparatus and FIG. 19(B) is a partial front view of the quarter thereof. The driving disc 5 and an intermediate disc are removed from FIG. 19(B), in order to facilitate understanding of the structure of the apparatus.

The torque transmission apparatus according to the fifth embodiment of the present invention also transmits torque from the driving disc 5, which is connected to the power source such as a motor, to the driven disc 6 serving as the driving unit.

The fifth embodiment of the present invention differs from the first embodiment of the present invention in that the plurality of torque transmission units includes the first sub-unit and the second sub-unit.

The first sub-unit is composed of a plurality of first rails 27, 27, and a plurality of first connection blocks 29 . . . 29 for the driving disc 5. The second sub-unit is composed of a plurality of second rails 28, 28 and a plurality of second connection blocks 30 . . . 30 for the driven disc 6.

The first and second sub-units are used in combination with an intermediate disc 26 having a thin ring-shape, which is disposed as an intermediate unit between the driving disc 5 and the driven disc 6. The first rails 27, 27 are mounted on one of opposite surfaces of the intermediate disc 26, which is placed on the side of the driving disc 5, so as to be in parallel with each other. The second rails 28, 28 are mounted on the other of opposite surfaces of the intermediate disc 26, which is placed on the side of the driven disc 6, so as to be in parallel with each other. The first rails 27, 27 apparently intersect the second rails 28, 28 at different positions from the central axis "C" of the driving disc 5, as shown in FIG. 20.

The pair of first connection blocks 29, 29 is slidably mounted on each of the first rails 27, 27 at the apparently intersecting positions of the first rails 27, 27 and the second rails 28, 28. The four first connection blocks 29 . . . 29 are placed at regular intervals on a circle, which is concentric with the central axis "C" of the driving disc 5. When the central axis of the driving disc 5 and the central axis of the driven disc 6 are coincide with each other, the centers of the first connection blocks 29 . . . 29 are placed at regular intervals on the above-mentioned circle. The first connection blocks 29 . . . 29 are secured on the driving disc 5 by fastening members such as bolts, but the detailed description thereof will be given later.

The pair of second connection blocks 30, 30 is slidably mounted on each of the second rails 28, 28 at the apparently intersecting positions of the first rails 27, 27 and the second rails 28, 28. The four second connection blocks 30 . . . 30 are placed at regular intervals on a circle, which is concentric with the central axis "C" of the driving disc 5. When the central axis of the driving disc 5 and the central axis of the driven disc 6 are coincide with each other, the centers of the second connection blocks 30 . . . 30 are placed at regular intervals on the above-mentioned circle. The second connection blocks 30 . . . 30 are secured on the driven disc 6 by fastening members such as bolts, but the detailed description thereof will be given later.

The above-described first and second sub-units are combined together to form a transmission mechanism 25 as shown in FIG. 19(A).

Figure 21:
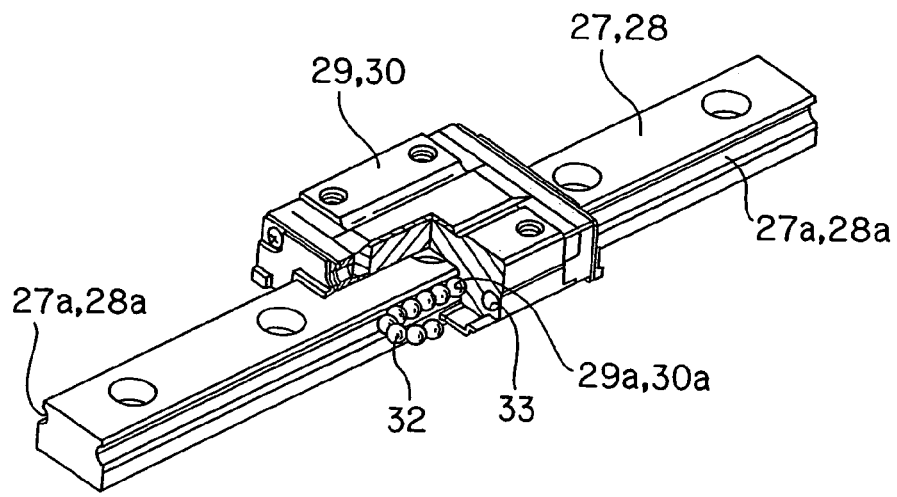
FIG. 21 is a perspective view illustrating a linear guide mechanism, which is incorporated into the torque transmission apparatus according to the fifth embodiment of the present invention and is partially broken to expose an internal structure.

In addition, the first sub-unit includes first linear guide mechanisms, and the second sub-unit includes second linear guide mechanisms. Each of the first linear guide mechanisms and each of the second linear guide mechanisms have the same structure. Only one of the first linear guide mechanisms will be described below as a typical structure with reference to FIG. 21.

The first rail 27 is provided with ball-running grooves 27*a* . . . 27*a* serving as the first rolling member running sections in which balls 32 . . . 32 serving as the rolling member travel, which sections are formed so as to extend in the longitudinal direction of the first rail 27.

The connection block 29, which is formed into a saddle-shape, is provided at one of the opposite sides thereof with a recess in which the first rail 27 is slidably received. The connection block 29 is also provided at its portion defining the recess with loaded-ball-running grooves 29*a* . . . 29*a* serving as the first loaded-rolling member running sections, which serve as the counter part relative to the above-mentioned ball-running grooves 27*a* . . . 27*a*. In addition, the connection block 29 is also provided not only with ball returning paths 33 . . . 33, which are formed in parallel with the above-mentioned loaded-ball-running grooves 27*a* . . . 27*a*, but also with pairs of U-shaped direction change paths, each pair of which connects the opposite ends of the respective loaded-ball-running groove 27*a* to the opposite ends of the respective ball returning path 33. The loaded-ball-running groove 27*a*, the ball returning path 33 and a pair of direction change paths constitutes a single elliptic ball circulation passage serving as the first rolling member circulation passage in which the balls travel. The ball circulation passages are provided in accordance with the number of the ball-running grooves 27*a* . . . 27*a* formed on the first rail 27. The number of the ball-running grooves 27*a* . . . 27*a* and arrangement thereof are determined based on magnitude of load and directions thereof.

The balls may travel between the ball-running grooves of the first rail 27 (or the second rail 28) and the loaded-ball-running grooves of the connection block 29 (or 30), not in an endlessly circulating manner, but in a reciprocating manner. In this case, the reciprocating motion of the balls puts restrictions on a range in which the connection block 29 (or 30) can move relative to the first rail 27 (or the second rail 28).

The above-described structure ensures not only a smooth slide of the first rails, i.e., the driving-side rails 27, 27 relative to the first connection blocks, i.e., the driving-side connection blocks 29 . . . 29 in the direction along which the driving-side rails 27 extend, but also a smooth slide of the second rails, i.e., the driven-side rails 28, 28 relative to the second connection blocks, i.e., the driven-side connection blocks 30 . . . 30 in the direction along which the driven-side rails 28 extend. It is therefore possible to move the driving disc 5 relative to the driven disc 6 in the directions along which the driving-side rails 27, 27 and the driven-side rails 28, 28 extend, i.e., on a plane including such directions.

Rotation of the driving disc 5 caused by actuating the power source such as a motor causes torque from the driving disc 5 to be transmitted to the intermediate disc 26 through the first sub-unit, and then torque from the intermediate disc 26 to be transmitted to the driven disc 6 through the second sub-unit, to rotate the driven disc 6 in the same angular velocity as the driving disc 5.

According to the fifth embodiment of the present invention, it is possible to constitute the torque transmission apparatus, with the use of a standard liner guide, which is composed of a rail and a block connected slidably to the rail. As a result, the torque transmission apparatus can be manufactured at low cost. In addition, connecting the first connection block 29 . . . 29, the first and second rails 27, 27, 28, 28 and the second connection block 30 . . . 30 to the driving disc 5 (i.e., the first unit), the intermediate disc 26 (i.e., the intermediate unit) and the driven disc 6 (i.e., the second unit), respectively, makes it possible to prevent the contact pressure between the first connection blocks 29 . . . 29 and the first rails 27, 27 or the second connection blocks 30 . . . 30 and the second rails 28, 28 from being increased due to the centrifugal force as applied, and to prevent also load applied to the rolling members from being increased.

Now, description will be given in detail below of measures to mount the first and second connection blocks 29 and 30 to the driving and driven discs 5 and 6, respectively. In the fifth embodiment of the present invention, recess-seats 5*b* are formed on the driving disc 5 so as to receive the respective first connection blocks 29 . . . 29. Each of the first connection blocks 29 . . . 29 is fitted into each of the recess-seats 5*b* and connected to the driving disc 5 by means of fastening members such as bolts. Through-holes 6*b* are formed in the driven disc 6 so as to receive the respective second connection blocks 30 . . . 30. Each of the second connection blocks 30 . . . 30 is movably fitted into the above-mentioned through-hole 6*b*, without being fixed by any fastening members such as bolts. The fifth embodiment of the present invention is not limited only to the fitting of the blocks 30 . . . 30 into the through-holes 6*b* formed in the driven disc 6. The driven disc 6 may be provided with rail-receiving recess in place of the through-holes 6*b*, serving as the rail-receiving portions. The structure, in which the blocks 30 . . . 30 can move in the direction of the central axis of the driven disc 6, suffices. Connection of the first connection blocks 29 . . . 29 to the driving disc 5 by the fastening members enables torque from the driving disc 5 to be transferred to the torque transmission mechanism 25. Fitting the blocks 30 . . . 30 into the through-holes 6b of the driven disc 6 enables torque from the torque transmission mechanism 25 to the driven disc 6.

According to the above-mentioned fifth embodiment of the present invention, it is possible to decrease the distance between the driving disc 5 and the driven disc 6 by the total depth of the recess-seat 5b and the through-hole 6b, thus decreasing the thickness of the torque transmission apparatus. In addition, the driven disc 6 can move slightly relative to the driving disc 5 in the direction of the central axis of the driving disc 5, thus making it possible to absorb displacement of the driven disc 6 from the driving disc 5 in the above-mentioned direction. Even in case where spatial restriction in the torque transmission apparatus disables fastening members such as bolts from being used, it is possible to place the first connection blocks 29 . . . 29 on the driving disc 5 and the second connection blocks 30 . . . 30 on the driven disc 6 in an appropriate manner.

Figure 22:
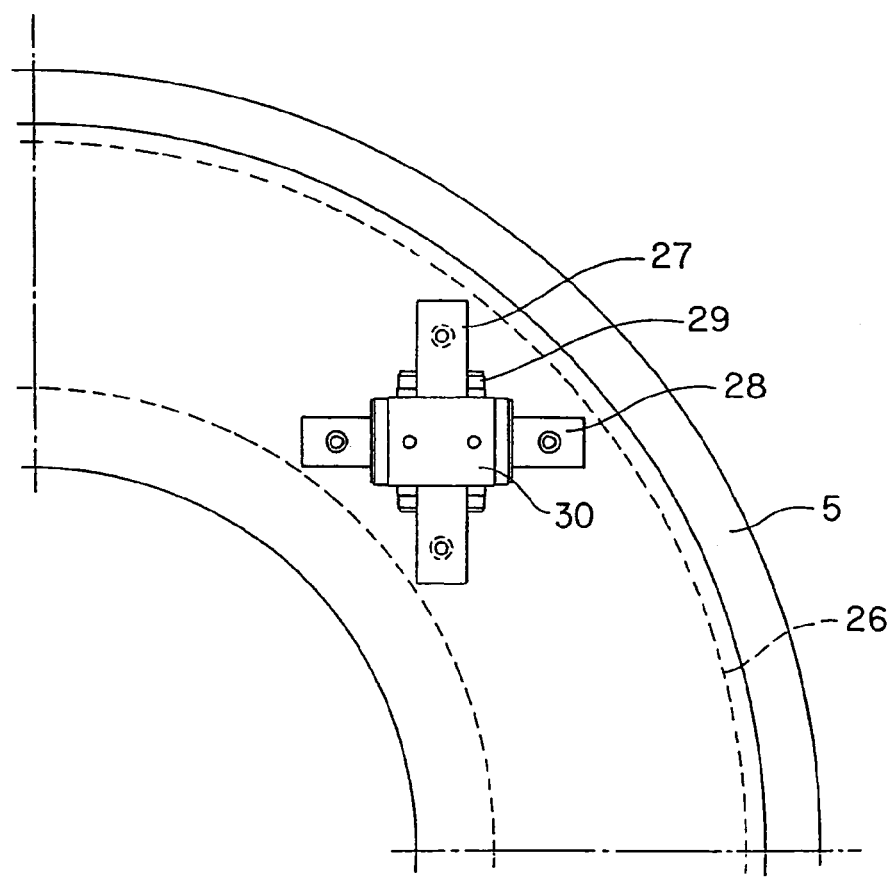
FIG. 22 is a front view of a quarter of the torque transmission apparatus according to the sixth embodiment of the resent invention.

FIG. 22 shows the torque transmission apparatus according to the sixth embodiment of the present invention. FIG. 22 is a front view of a quarter of the torque transmission apparatus. The driven disc and the intermediate disc are removed from FIG. 22, in order to facilitate understanding of the structure of the apparatus.

The sixth embodiment of the present invention has the similar structure to the above-described fifth embodiment of the present invention, except that each of the driving-side rails 27, 27 and the driven-side rails 28, 28 is divided into two pieces. In case where the range of movement of the driving-side connection blocks 29 . . . 29 relative to the driving-side rails 27, 27, and the range of movement of the driven-side connection blocks 30 . . . 30 relative to the driven-side rails 28, 28 are relatively small, the shorter length of the driving-side rails 27, 27 and the driven-side rails 28, 28 suffices as shown in FIG. 22. Decrease in length of the driving-side rails 27, 27 and the driven-side rails 28, 28 leads to reduction in weight thereof and makes it possible to increase the size of the opening formed in the intermediate disc 26, thus leading to remarkable reduction in weight of the apparatus.

Figure 23:
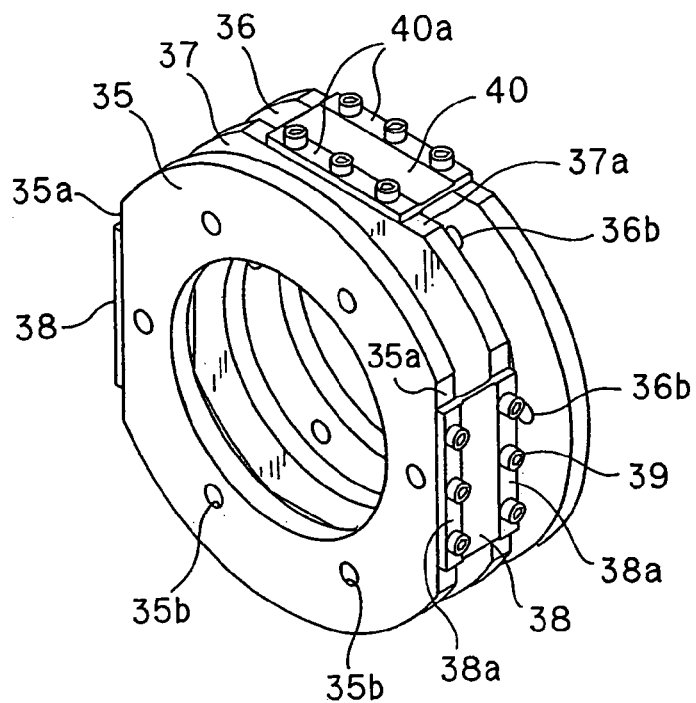
FIG. 23 is a perspective view illustrating the torque transmission apparatus according to the seventh embodiment of the present invention.
Figure 24A:
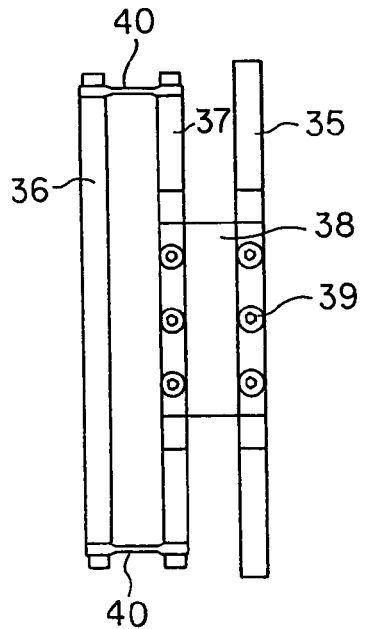
FIG. 24(A) is a side view illustrating the torque transmission apparatus according to the seventh embodiment of the present invention.
Figure 24B:
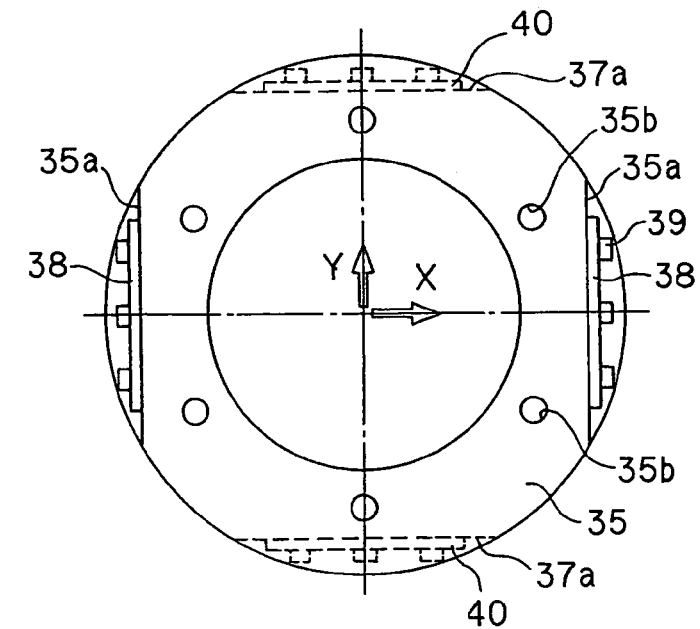
FIG. 24(B) is a front view thereof.

FIGS. 23, 24(A) and 24(B) show the torque transmission apparatus according to the seventh embodiment of the present invention. FIG. 23 is a perspective view illustrating the torque transmission apparatus; FIG. 24(A) is a side view illustrating the apparatus and FIG. 24(B) is a front view thereof.

The torque transmission apparatus transmits torque from a driving disc 35 serving as a driving unit (i.e., the first unit), which is connected to a power source such as a motor, to a driven disc 36 serving as a driven unit (i.e., the second unit). The driving disc 35 has mounting holes 35b . . . 35b through which the driving disc 35 is mounted to the side of the power source such as the motor. The driven disc 36 has mounting holes 36b . . . 36b through which the driven disc 36 is mounted to the driven side such as a member to be rotated.

An intermediate disc (i.e., a transmitting disc) 37 serving as an intermediate unit is placed between the driving disc 35 and the driven disc 36. A plane on which the driving disc 35 extends, is in parallel with a plane on which the transmitting disc 37 extends. The plane on which the transmitting disc 37 extend, in also in parallel with a plane on which the driven disc 36 extends. Each of the driving disc 35, the transmitting disc 37 and the driven disc 36 is formed into a thin ring-shape, in order to reduce weight.

The driving disc 35 and the transmitting disc 37 are connected to each other by means of a pair of leaf springs (i.e., the first leaf springs) 38, 38. The driving disc 35 is provided at the opposite sides in the first perpendicular direction "X" to the central axis of the driving disc 35 with flat portions 35a, 35a. The transmitting disc 37 has the same flat portions. The opposite sides 38a, 38a of each of the first leaf springs 38, 38 are fixed to the respective flat portions of the driving disc 35 and the transmitting disc 37 by means of fastening members 39 . . . 39 such as bolts, without causing backlash.

The pair of first leaf springs 38, 38 has the same width in the direction, which is in parallel with the central axis of the driving disc 35, so that the driving disc 35 and the transmitting disc 37 are in parallel with each other. A warp of each of the first leaf springs 38, 38 enables the transmitting disc 37 to move relative to the driving disc 35 in the first direction "X" in FIG. 24(B), which is perpendicular to the central axis of the driving disc 35, while maintaining a parallel state with the driving disc 35.

The transmitting disc 37 and the driven disc 36 are also connected to each other by means of a pair of leaf springs 40, 40 (i.e., the second leaf springs). The transmitting disc 37 is provided at the opposite sides in the second perpendicular direction "Y" in FIG. 24(B), which is perpendicular to the central axis of the transmitting disc 37 with flat portions 37a, 37a. The first perpendicular direction "X" is perpendicular to the second perpendicular direction "Y". The driven disc 36 has the same flat portions. The opposite sides 40a, 40a of each of the second leaf springs 40, 40 are fixed to the respective flat portions of the transmitting disc 37 and the driven disc 36 by means of fastening members such as bolts, without causing backlash.

The pair of second leaf springs 40, 40 has the same width in the direction, which is in parallel with the central axis of the driven disc 36, so that the transmitting disc 37 and the driven disc 36 are in parallel with each other. A warp of each of the second leaf springs 40, 40 enables the driven disc 36 to move relative to the transmitting disc 37 in the second direction "Y" in FIG. 24(B), which is perpendicular to the central axis of the driven disc 36, while maintaining a parallel state with the driven disc 36.

The plane on which the first leaf spring 38 extends, intersects the plane on which the second leaf spring 40 extends, at right angles. The first perpendicular direction "X" is perpendicular to the second perpendicular direction "Y", as mentioned above, with the result that the displacing direction of the transmitting disc 37 from the driving disc 35 is also perpendicular to the displacing direction of the driven disc 36 from the transmitting disc 37.

Rotation of the driving disc 35 caused by actuating the power source such as a motor causes torque from the driving disc 35 to be transmitted to the transmitting disc 37 through shearing stress applied to the first leaf springs 38, 38, to rotate the transmitting disc 37 in the same angular velocity as the driving disc 35. Rotation of the transmitting disc 37 causes torque from the transmitting disc 37 to be transmitted to the driven disc 36 through shearing stress applied to the second leaf springs 40, 40, to rotate the driven disc 36 in the same angular velocity as the transmitting disc 37. The warp of the first leaf springs 38, 38 and the second leaf springs 40, 40 enables the driven disc 36 to be displaced from the driving disc 35, while maintaining a parallel state with the driving disc 35. There can be ensured a relative displacement between the driving disc 35 and the driven disc 36 in a state in which the central axes thereof are kept in parallel with each other.

Figure 25:
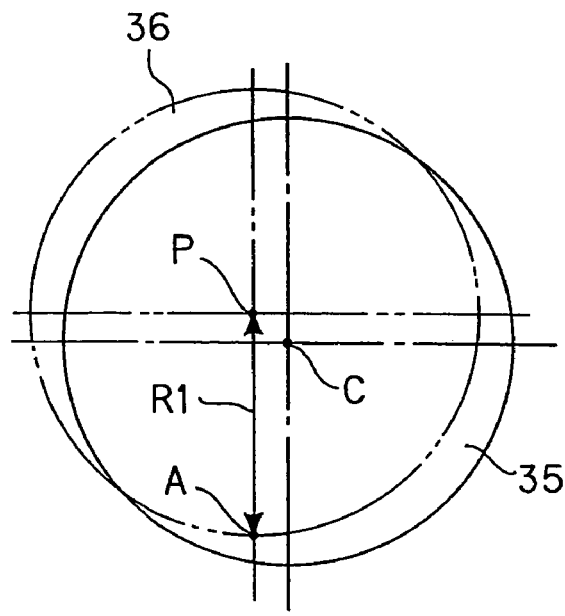
FIG. 25 is a schematic front view illustrating a state in which there occurs a relative displacement between the central axis of the first unit, i.e., a driving disc and the central axis of the second unit, i.e., a driven disc of the torque transmission apparatus according to the seventh embodiment of the present invention.

FIG. 25 shows a state in which the driven disc 36 is displaced from the driving disc 35 in the perpendicular direction to the central axis of the driving disc 35. In the seventh embodiment of the present invention, the driving disc 35 and the transmitting disc 37 are connected to each other by means of the first leaf springs 38, 38, on the one hand, and the transmitting disc 37 and the driven disc 36 are connected to each other by means of the second leaf springs 40, 40, on the other hand. Even when the driven disc 46 is displaced from the driving disc 35 in the perpendicular direction to the central axis "C" of the driving disc 35 (namely, the central axis "P" of the driven disc 36 is displaced from the central axis "C" of the driving disc 35), the driven disc 36 always rotates around the central axis "P" thereof. As a result, the distance "R1" between the central axis "P" of the driven disc 36 and a point "A", which is located on the periphery of the driven disc 36, does not vary, thus causing no variation in circumferential velocity at the point "A".

Figure 26:
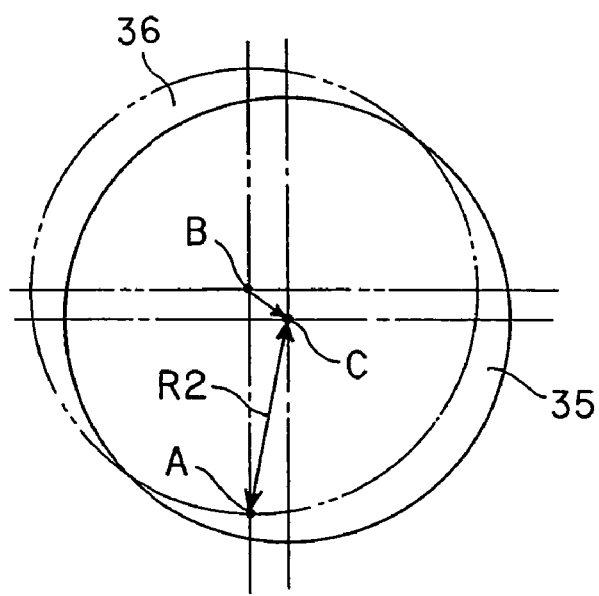
FIG. 26 is a schematic front view illustrating a state in which there occurs a relative displacement between the central axis of a driving disc and the central axis of a driven disc of the torque transmission apparatus in which the conventional Oldham coupling is utilized.

FIG. 26 shows a state in which a driven disc 36 is displaced from a driving disc 35 in the perpendicular direction to the central axis of the driving disc 35 in a comparison case in which the conventional Oldham coupling is utilized. In the comparison case in which the Oldham coupling is utilized, when the driven disc 36 is displaced from the driving disc 35 in the perpendicular direction to the central axis of the driving disc 35, the center of rotation of the driven disc 36 is shifted from the position "B" (i.e., the position of the center of the driven disc 36) in FIG. 26 to the other position "C" (i.e., the position of the center of the driving disc 35) in FIG. 26. Accordingly, the distance "R2" between the center of rotation "C" of the driven disc 36 and a point "A", which is located on the periphery of the driven disc 36, varies, thus causing variation in circumferential velocity at the point "A".

When the driven disc 36 is displaced from the driving disc 35 in the perpendicular direction to the central axis of the driving disc 35, the first leaf springs 38, 38 and the second leaf springs 40, 40 serve as a resilient member to impart a resilient force to the driving disc 35 and the driven disc 36 so as to recover their initial positional relationship.

Figure 27:
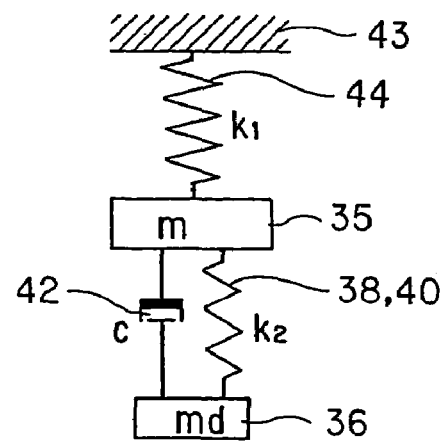
FIG. 27 is a schematic diagram showing a case in which a resilient member is connected between the first unit and the second unit in the torque transmission apparatus according to the seventh embodiment of the present invention.

FIG. 27 is a schematic diagram showing a case in which the leaf springs and a damper are added to the torque transmission apparatus. As shown in FIG. 27, the damper 42 to attenuate oscillation may be added between the driving disc 35 and the driven disc 36, in addition to the first leaf springs 38, 38 and the second leaf springs 40, 40. Further, the side of the driving disc 35 (i.e., the driving power source such as the motor to rotate the driving disc 35 and the driven disc 36) may be connected to a base 43 through another spring 44 so as to be oscillatable.

In the above-described structure in which the driving disc 35 and the driven disc 36 are connected to each other through the spring 38, 40, 44 and the damper 42, even when an impact is given to the driven disc 36, the impact as given to the driven disc 36 is not transmitted directly to the driving disc 35. In addition, when the driven disc 36 is oscillated, mass of the side of the driving disc 35 serves as a balancer, thus making it possible to attenuate oscillation of the side of the driven disc 36 through oscillation of the side of the driving disc 35.

Figure 28:
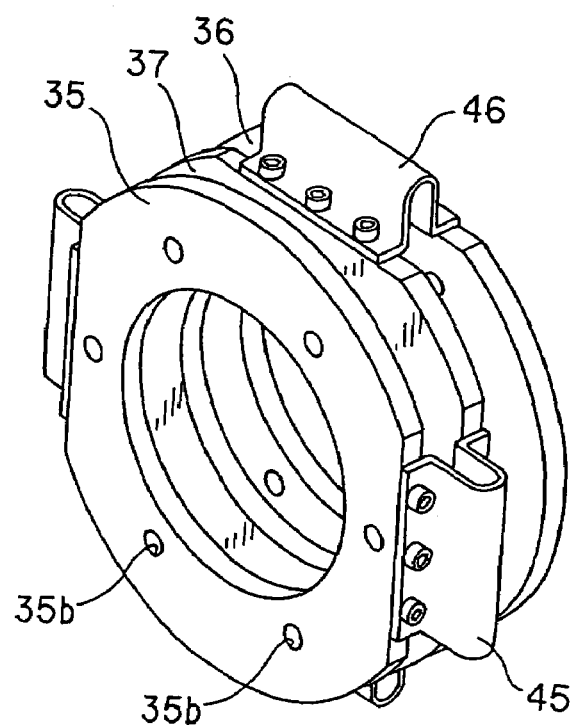
FIG. 28 is a perspective view illustrating the torque transmission apparatus according to the eighth embodiment of the present invention.
Figure 29A:
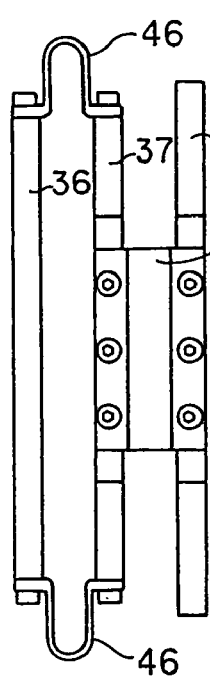
FIG. 29(A) is a side view illustrating the torque transmission apparatus according to the eighth embodiment of the present invention.
Figure 29B:
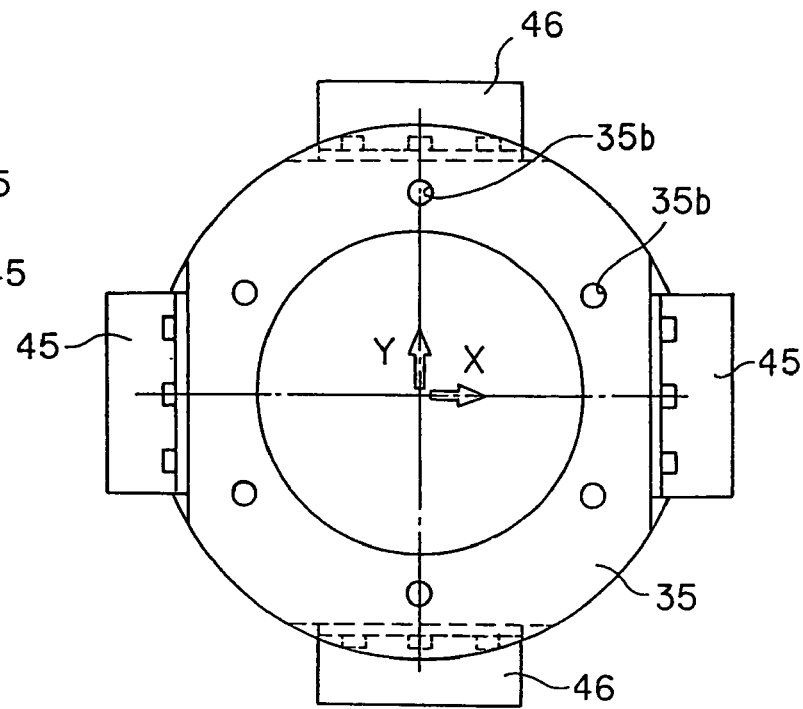
FIG. 29(B) is a front view thereof.

FIGS. 28, 29 (A) and 29(B) show the torque transmission apparatus according to the eighth embodiment of the present invention. FIG. 28 is a perspective view illustrating the torque transmission apparatus; FIG. 29(A) is a side view illustrating the torque transmission apparatus; and FIG. 29(B) is a front view thereof.

The torque transmission apparatus according to the eighth embodiment of the present invention also transmits torque from the driving disc 35 to the driven disc 36. An intermediate disc (i.e., a transmitting disc) 37 is placed between the driving disc 35 and the driven disc 36.

The driving disc 35 and the transmitting disc 37 are connected to each other by means of a pair of leaf springs (i.e., the first leaf springs) 45, 45. A warp of each of the first leaf springs 45, 45 enables the transmitting disc 37 to move relative to the driving disc 35 in the first direction "X" in FIG. 29 (B), which is perpendicular to the central axis of the driving disc 35, while maintaining a parallel state with the driving disc 35. In the eighth embodiment of the present invention, each of the first leaf springs 45, 45 is formed into a U-shape in cross-section so as to ensure a large amount of displacement of the transmitting disc 37 from the driving disc 35 in the direction of the central axis of the driving disc 35, and namely, a large amount of movement in such a direction when the transmitting disc 37 comes close to or moves away from the driving disc 35.

The transmitting disc 37 and the driven disc 36 are also connected to each other by means of a pair of leaf springs 46, 46 (i.e., the second leaf springs). A warp of each of the second leaf springs 46, 46 enables the driven disc 36 to move relative to the transmitting disc 37 in the second direction "Y" in FIG. 29(B), which is perpendicular to the central axis of the transmitting disc 37, while maintaining a parallel state with the transmitting disc 37. In the eighth embodiment of the present invention, each of the second leaf springs 46, 46 is also formed into a U-shape in cross-section so as to ensure a large amount of displacement of the driven disc 36 from the transmitting disc 37 in the direction of the central axis of the transmitting disc 37, and namely, a large amount of movement in such a direction when the driven disc 36 comes close to or moves away from the transmitting disc 37.

When the first leaf springs 45, 45 and the second leaf springs 46, 46 warp to cause displacement of the driven disc 36 from the driving disc 35 in the perpendicular direction to the central axis of the driving disc 35 (i.e., the direction "X" or "Y" in FIG. 29(B)), the distance between the driving disc 35 and the driven disc 36 in the direction of the driving disc 35 varies. The first leaf springs 45, 45 and the second leaf springs 46, 46, which have the U-shaped cross-section, absorb the variation in distance between the driving disc 35 and the driven disc 36 in the direction of the driving disc 35. The first leaf springs 45, 45 and the second leaf springs 46, 46, which have such a U-shaped cross-section, also enable the central axis of the driven disc 36 to incline slightly relative to the central axis of the driving disc 35.

Figure 30:
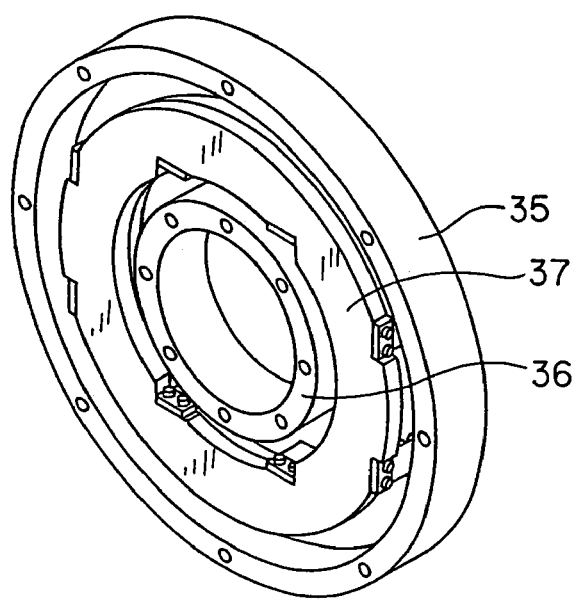
FIG. 30 is a perspective view illustrating the torque transmission apparatus according to the ninth embodiment of the present invention.
Figure 31:
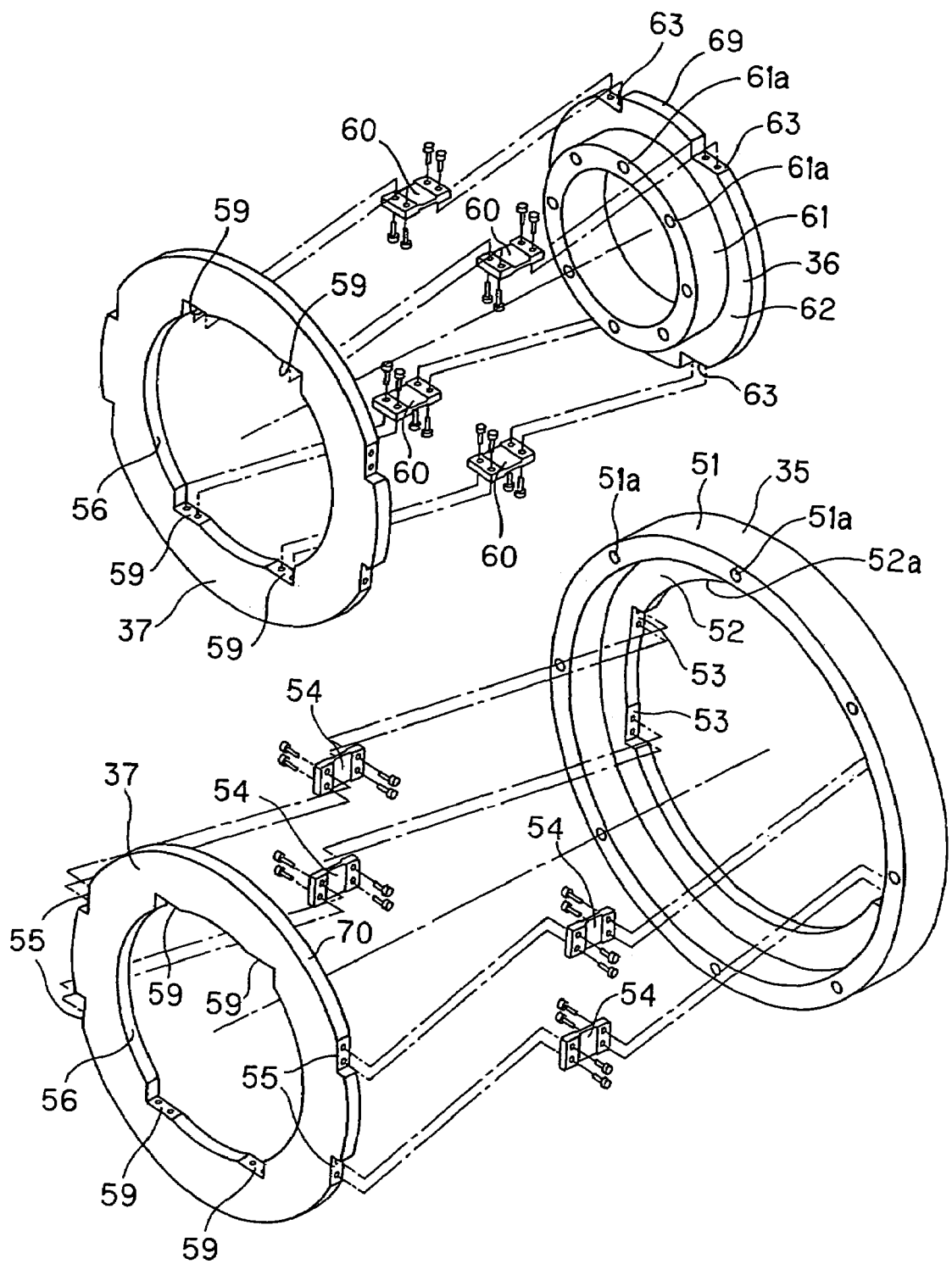
FIG. 31 is an exploded perspective view illustrating the torque transmission apparatus according to the ninth embodiment of the present invention.

FIGS. 30 and 31 show the torque transmission apparatus according to the ninth embodiment of the present invention. FIG. 30 is a perspective view illustrating the torque transmission apparatus; and FIG. 31 is an exploded perspective view illustrating the torque transmission apparatus. In the above-described eighth embodiment of the present invention, three discs, i.e., the driving disc 35, the transmitting disc 37 and the driven disc 36 are aligned parallelly with each other, thus requiring a relatively long distance in the direction of the rotational axis. In view of this fact, this problem is solved by the ninth embodiment of the present invention in which the transmitting disc 37 is placed in the driving disc 35, and the driven disc 36 is placed in the transmitting disc 37.

The driving disc 35 is provided with a peripheral portion 51 having a ring-shape, and an inwardly projecting flange 52, which extends from the inner peripheral surface of the peripheral portion 51. The inwardly projecting flange 52 defines an opening formed therein. The peripheral portion 51 is provided on its end surface, which is opposite to the flange 52, with fitting holes 51a . . . 51a through which the driving disc 35 is mounted to the side of the power source such as the motor. The flange 52 has a pair of fitting recesses serving as a part of the opening edge 52a of the flange 52. Each of the fitting recesses has a pair of flat portions 53, 53. These fitting recesses are placed so as to be apart from each other in the first direction (i.e., the direction from the upper and left-hand side to the lower and right-hand side in FIG. 31) perpendicular to the central axis of rotation. Four driving-side leaf springs (i.e., the first leaf springs) 54, 54, 54, 54 are fixed at their respective one ends to the above-mentioned flat portions 53, 53, 53, 53, respectively. Planes on which the driving-side leaf springs 54, 54, 54, 54 extend respectively, are in parallel with each other so as to enable the transmitting disc 37 to be displaced from the driving disc 35, while maintaining a parallel state with the driving disc 35.

The transmitting disc 37 having a ring-shape is received in the peripheral portion 51 of the driving disc 35. The transmitting disc 37 is provided on its outer periphery with two pairs of flat portions 55, 55, 55, 55, which correspond to the flat portions 53, 53, 53, 53 of the driving disc 35, respectively. The above-mentioned four driving-side leaf springs (i.e., the first leaf springs) 54, 54, 54, 54 are fixed at their respective other ends to the above-mentioned flat portions 55, 55, 55, 55 of the transmitting disc 37, respectively.

In addition, the transmitting disc 37 is provided on its inner peripheral surface with a pair of fitting recesses serving as a part of the opening edge 56 of the transmitting disc 37. Each of the fitting recesses has a pair of flat portions 59, 59. These fitting recesses are placed so as to be apart from each other in the second direction (i.e., the vertical direction in FIG. 31) perpendicular to the above-mentioned first direction. Four driven-side leaf springs (i.e., the second leaf springs) 60, 60, 60, 60 are fixed at their respective one ends to the above-mentioned flat portions 59, 59, 59, 59, respectively. Planes on which the driven-side leaf springs 60, 60, 60, 60 extend respectively, are in parallel with each other and perpendicular to the above-mentioned planes on which the driving-side leaf springs 54, 54, 54, 54 extend respectively.

The driven disc 36 has an inner peripheral portion 61 having a ring-shape, and an outwardly projecting flange 62, which extends from the inner peripheral portion 61. The inner peripheral portion 61 is provided on its end surface, which is opposite to the flange 62, with fitting holes 61a . . . 61a through which the driven disc 36 is mounted to the driven side. In addition, the flange 62 of the driven disc 36 is provided on its outer periphery with two pairs of flat portions 63, 63, 63, 63, which correspond to the flat portions 59, 59, 59, 59 of the transmitting disc 37, respectively. The inner peripheral portion 61 of the driven disc 36 is received in the opening 56 of the transmitting disc 37, and the driven-side leaf springs (i.e., the second leaf springs) 60, 60, 60, 60 are fixed at their respective other ends to the above-mentioned flat portions 63, 63, 63, 63 of the driven disc 36, respectively.

In the ninth embodiment of the present invention, the transmitting disc 37 is received in the peripheral portion 51 of the driving disc 35 and the inner peripheral portion 61 of the driven disc 36 is received in the transmitting disc 37 so that the driving-side leaf springs 54, 54, 54, 54 by which the driving disc 35 and the transmitting disc 37 are connected with each other overlap the driven-side leaf springs 60, 60, 60, 60 in the direction of the axis of rotation, thus making it possible to decrease the thickness of the torque transmission apparatus in the direction of the central axis thereof.

Figure 32:
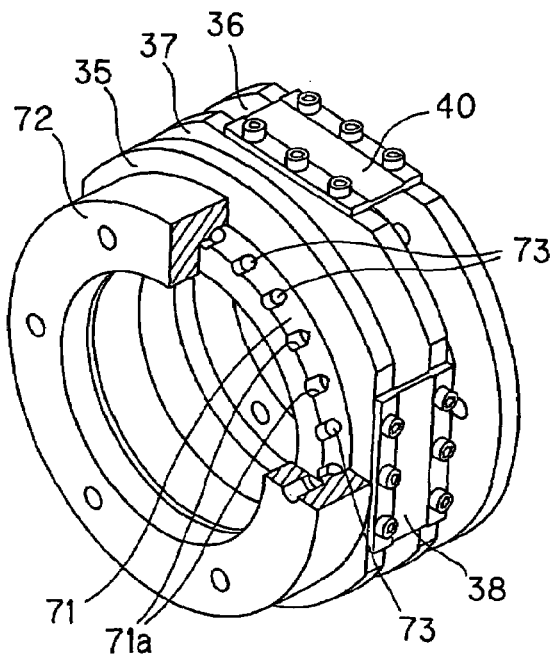
FIG. 32 is a perspective view illustrating the torque transmission apparatus according to the tenth embodiment of the present invention.
Figure 33A:
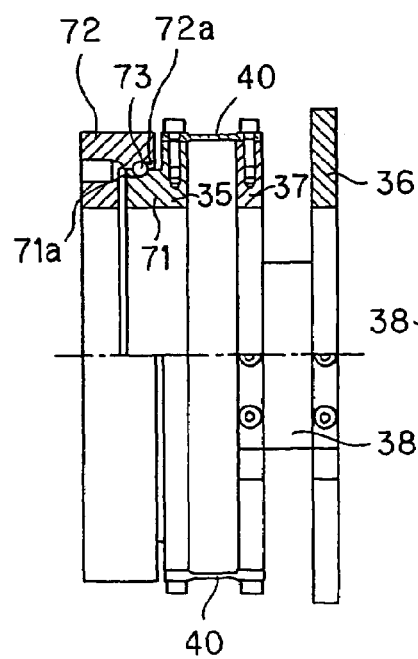
FIG. 33(A) is a side view illustrating the torque transmission apparatus according to the tenth embodiment of the present invention.
Figure 33B:
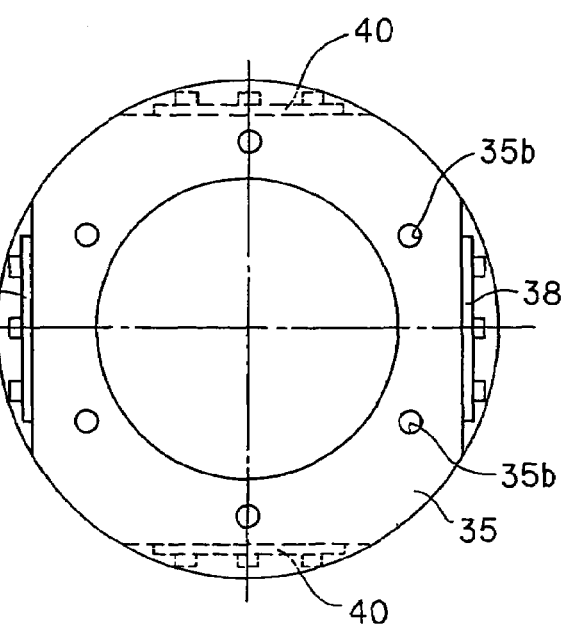
FIG. 33(B) is a front view thereof.
Figure 34:
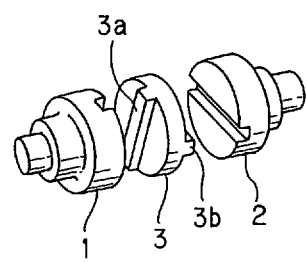
FIG. 34 is an exploded perspective view illustrating the conventional Oldham coupling.

FIGS. 32, 33(A) and 33(B) show the torque transmission apparatus according to the tenth embodiment of the present invention. FIG. 32 is a perspective view illustrating the torque transmission apparatus; FIG. 33(A) is a side view illustrating the apparatus; and FIG. 33(B) is a front view thereof. The tenth embodiment of the present invention is constituted by incorporating a spline connection mechanism into the above-described ninth embodiment of the present invention. The driving disc 35, the transmitting disc 37 and the driven disc 36 have the same structures as those in the above-described seventh embodiment of the present invention. The same reference numerals are given to the same structural components, and description thereof is omitted.

The spline connection mechanism is composed of an inner circumferential member 71, an outer circumferential member 72 and a plurality of balls 73 . . . 73 serving as rolling members.

The driving disc 35 is provided integrally with the inner circumferential member 71, which extends outwardly in the direction of the central axis of the driving disc 35. The inner circumferential member 71 has on its outer peripheral surface a plurality of key grooves 71a . . . 71a extending in parallel with the central axis of the driving disc 35.

The outer circumferential member 72 has a ring-shaped recess into which the inner circumferential member 71 of the driving disc 35 is fitted so as to be slidable in the direction of the central axis of the driving disc 35. The outer circumferential member 72 is provided, on its inner peripheral surface defining the above-mentioned ring-shaped recess, with a plurality of counter-key grooves 72a . . . 72a, which extend in parallel with the central axis of the driving disc 35 so as to correspond to the above-mentioned key grooves 71a . . . 71a of the inner circumferential member 71.

The balls 73 . . . 73 are held between the key grooves 71a . . . 71a of the inner circumferential member 71 and the counter-key grooves 72a . . . 72a of the outer circumferential member 72 so as to be capable of rolling therein.

The outer circumferential member 72 is provided on its end surface, which is opposite to the above-mentioned ring-shaped recess, with fitting holes 72a . . . 72a through which the outer circumferential member 72 is mounted to the side of the power source such as the motor. The spline connection mechanism having the above-described structure permits transmission of torque from the motor to the driving disc 35 as well as displacement of the driving disc 5 from the outer circumferential member 72 in the direction of the central axis of the driving disc 5.

A warp of the first (i.e., driving-side) leaf springs 38, 38 and the second (i.e., driven-side) leaf springs 40, 40 leads to slight variation in distance between the driving disc 35 and the driven disc 36 in the direction of the central axis of the driving disc 35. Such a spline connection mechanism can absorb such variation in distance.

Application of the present invention is not limited only to an apparatus for specific uses. The present invention may be applied any kind of apparatus in which torque is transmitted from a driving side to a driven side, e.g., machine tools, construction machinery and industrial robots.

According to the present invention as described in detail, it is possible to distribute load applied to the whole apparatus to the plurality of torque transmission units, thus leading to reduction in load, which each of the torque transmission units is to bear. In addition, it is possible to provide achievement of a reduced weight of the torque transmission apparatus and to decrease the thickness of the torque transmission apparatus, and more specifically, to achieve miniaturization of the apparatus in the direction of the central axis thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-80778 filed on Mar. 24, 2003 including the specification, claims, drawings and summary, the entire disclosure of Japanese Patent Application No. 2003-172279 filed on Jun. 17, 2003 including the specification, claims, drawings and summary and the entire disclosure of Japanese Patent Application No. 2003-95212 filed on Mar. 31, 2003 including the specification, claims, drawings and summary are incorporated herein by reference in its entirety.

What is claimed is:

1. An apparatus for transmitting torque from a driving unit to a driven unit, comprising:
   a first unit serving as the driving unit, which is rotatable around a central axis thereof, said first unit having a first reference plane;
   a second unit serving as the driven unit, which is rotatable around a central axis thereof, said second unit having a second reference plane facing said first reference plane; and
   plural sets of torque transmission units for transmitting torque from said first unit to said second unit, each of said plural sets of torque transmission units comprises:
   a first rail mounted on said first unit, said first rail extending linearly in a predetermined direction on the first reference plane;
   a second rail mounted on said second unit so as to be spaced apart from said first rail in a direction, which is in parallel with the central axis of said first unit, said second rail extending linearly on the second reference plane in a different direction from said predetermined direction along which said first rail extends; and
   a connection block for connecting said first rail and said second rail to each other, said connection block being slidable relative to each of said first rail and said second rail,
   wherein said plural sets of torque transmission units enable a relative displacement between said first unit and said second unit in a direction perpendicular to the central axis of said first unit in a state in which the central axis of said first unit and the central axis of said second unit are kept in parallel with each other, said plural sets of torque transmission units being independent from each other and placed on a predetermined circle around the central axes of the first and second units so as to be spaced from each other.

2. The apparatus as claimed in claim 1, wherein:
said plural sets of torque transmission units are disposed at predetermined intervals on the predetermined circle.

3. The apparatus as claimed in claim 1, wherein:
each of said plural sets of torque transmission units further comprises:
(a) a first linear guide mechanism comprising:
   (i) a first rolling member running section provided in said first rail, said first rolling member running section extending along a longitudinal direction of said first rail;
   (ii) a first rolling member circulation passage provided in said connection block, said first rolling member circulation passage including a first loaded-rolling member running section serving as a counterpart relative to said first rolling member running section of said first rail; and
   (iii) a plurality of first rolling members received in said first rolling member circulation passage; and
(b) a second linear guide mechanism comprising:
   (i) a second rolling member running section provided in said second rail, said second rolling member running section extending along a longitudinal direction of said second rail;
   (ii) a second rolling member circulation passage provided in said connection block, said second rolling member circulation passage including a second loaded-rolling member running section serving as a counterpart relative to said second rolling member running section of said second rail; and
   (iii) a plurality of second rolling members received in said second rolling member circulation passage.

4. The apparatus as claimed in claim 2, wherein:
said second rail extends in a direction, which is substantially perpendicular to said predetermined direction along which said first rail extends; and
each of said first rail and said second rail is placed in a different position from a position corresponding to said predetermined circle.

* * * * *